(12) United States Patent
Kim et al.

(10) Patent No.: US 11,756,547 B2
(45) Date of Patent: Sep. 12, 2023

(54) METHOD FOR PROVIDING SCREEN IN ARTIFICIAL INTELLIGENCE VIRTUAL ASSISTANT SERVICE, AND USER TERMINAL DEVICE AND SERVER FOR SUPPORTING SAME

(71) Applicant: Samsung Electronics Co., Ltd., Gyeonggi-do (KR)

(72) Inventors: Hyeonjeong Kim, Gyeonggi-do (KR); Seungyup Lee, Gyeonggi-do (KR); Soyoung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 279 days.

(21) Appl. No.: 17/420,926

(22) PCT Filed: Jun. 29, 2021

(86) PCT No.: PCT/KR2021/008176
§ 371 (c)(1),
(2) Date: Jul. 6, 2021

(87) PCT Pub. No.: WO2022/010157
PCT Pub. Date: Jan. 13, 2022

(65) Prior Publication Data
US 2023/0142110 A1    May 11, 2023

(30) Foreign Application Priority Data
Jul. 6, 2020  (KR) .......................... 10-2020-0083095

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/1815* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS 5,706,573 A * 1/1998 Lee ....................... G11B 25/043
                                                         360/99.18
10,586,536 B2 * 3/2020 Jeong ...................... G06F 3/167
(Continued)

FOREIGN PATENT DOCUMENTS

KR          10-1283461          7/2013
KR       10-2014-0082771        7/2014
(Continued)

OTHER PUBLICATIONS

International Search Report dated Sep. 24, 2021 issued in counterpart application No. PCT/KR2021/008176, 7 pages.

*Primary Examiner* — Marcus T Riley
(74) *Attorney, Agent, or Firm* — The Farrell Law Firm, P.C.

(57) ABSTRACT

A user terminal device includes a display; at least one sensor; a communication module; and a processor operatively connected to the display, the at least one sensor, and the communication module, wherein the processor is configured to, based on receiving a user utterance voice, determine whether or not a response screen corresponding to the user utterance voice is able to be provided through the display on the basis of at least one of a sensed value obtained from the at least one sensor or an inactive period of the display, based on determining that the response screen is unable to be provided through the display, receive current status information of at least one external device connected (Continued)

to the user terminal device through the communication module, determine one external device among the at least one external device to display the response screen on the basis of the current status information of the at least one external device, obtain the response screen to the user utterance voice, and transmit the response screen to the one external device through the communication module.

15 Claims, 13 Drawing Sheets

(51) Int. Cl.
  *G10L 15/18*  (2013.01)
  *G10L 15/30*  (2013.01)

(56) References Cited

U.S. PATENT DOCUMENTS

| | | | | |
|---|---|---|---|---|
| 10,891,968 B2* | 1/2021 | Chung | | H04M 3/4936 |
| 11,355,127 B2* | 6/2022 | Lee | | G06F 3/167 |
| 11,521,621 B2* | 12/2022 | Yang | | G10L 17/04 |
| 2014/0195249 A1* | 7/2014 | Chung | | G10L 21/06 |
| | | | | 704/275 |
| 2014/0278438 A1 | 9/2014 | Hart et al. | | |
| 2015/0350297 A1* | 12/2015 | Yang | | H04L 67/025 |
| | | | | 715/740 |
| 2016/0070580 A1 | 3/2016 | Johnson et al. | | |
| 2017/0256260 A1* | 9/2017 | Jeong | | G06F 3/16 |
| 2018/0285065 A1 | 10/2018 | Jeong | | |
| 2019/0172467 A1 | 6/2019 | Kim et al. | | |
| 2020/0194008 A1* | 6/2020 | Lee | | G10L 17/22 |
| 2020/0234715 A1* | 7/2020 | Kim | | G10L 15/22 |
| 2020/0257496 A1 | 8/2020 | Lee et al. | | |
| 2020/0342869 A1* | 10/2020 | Lee | | G10L 15/22 |
| 2021/0398528 A1* | 12/2021 | Kim | | G10L 15/22 |
| 2023/0142110 A1* | 5/2023 | Kim | | G10L 15/22 |
| | | | | 704/235 |

FOREIGN PATENT DOCUMENTS

| | | |
|---|---|---|
| KR | 1020170056586 | 5/2017 |
| KR | 1020180109496 | 10/2018 |
| KR | 1020190042903 | 4/2019 |
| KR | 1020190042931 | 4/2019 |
| KR | 1020200049020 | 5/2020 |
| KR | 1020200091278 | 7/2020 |

* cited by examiner

METHOD FOR PROVIDING SCREEN IN ARTIFICIAL INTELLIGENCE VIRTUAL ASSISTANT SERVICE, AND USER TERMINAL DEVICE AND SERVER FOR SUPPORTING SAME

CROSS-REFERENCE TO RELATED APPLICATION(S)

This application is a National Phase Entry of PCT International Application No. PCT/KR2021/008176, which was filed on Jun. 29, 2021, and claims priority to Korean Patent Application No. 10-2020-0083095 which was filed on Jul. 6, 2020, in the Korean Intellectual Property Office, the contents of which are incorporated herein by reference.

BACKGROUND

1. Field

Various embodiments relate to a method of providing a screen in an artificial intelligence virtual assistant service and an electronic device supporting the same.

2. Description of Related Art

Artificial intelligence systems have been utilized in various fields. Unlike an existing rule-based smart system, the artificial intelligence system is a system in which a machine learns and judges by itself to become smarter. As the artificial intelligence system is used more, a recognition rate thereof improves, and user's preferences are more accurately understood. Accordingly, existing rule-based smart systems are being gradually replaced by the deep-learning-based artificial intelligence systems.

Recently, various services using artificial intelligence virtual assistants (e.g., Bixby™, Assistant™, and Alexa™) providing responses to user voice inputs have been provided.

Various functions of an electronic device may be controlled by inputting voice commands through a microphone included in wireless earphones connected to the electronic device even without directly controlling the electronic device using a touch screen or physical buttons of the electronic device.

However, artificial intelligence virtual assistant services assume that the user is looking at the screen. Accordingly, artificial intelligence virtual assistant services communicate with the user through a voice, and also provide visual information through a display of the electronic device, thereby performing a complementary operation.

Therefore, in the case where the user is unable to view the display of the electronic device providing the artificial intelligence virtual assistant service because the electronic device is in a bag or pocket, or because the electronic device is located far away from the user, there is an inconvenience of relying only on auditory information in order to use the artificial intelligence virtual assistant service.

SUMMARY

The present disclosure has been made to address the above-mentioned problems and disadvantages, and to provide at least the advantages described below.

According to an aspect of the present disclosure, a user terminal device includes a display; at least one sensor; a communication module; and a processor operatively connected to the display, the at least one sensor, and the communication module, wherein the processor is configured, if a user utterance voice is received, to determine whether or not a response screen corresponding to the user utterance voice is able to be provided through the display on the basis of at least one of a sensed value obtained from the at least one sensor or an inactive period of the display, if it is determined that the response screen is unable to be provided through the display, to receive current status information of at least one external device connected to the user terminal device through the communication module, to determine one external device to display the response screen on the basis of the current status information of the at least one external device, to obtain the response screen to the user utterance voice, and to transmit the response screen to the one external device through the communication module.

According to another aspect of the present disclosure, a server may include a communication module; and a processor operatively connected to the communication module, wherein the processor may be configured to receive, from a first external device that receives a user utterance voice, information on the user utterance voice, current status information of the first external device, and current status information of at least one second external device connected to the first external device through the communication module, to receive current status information of at least one IoT device from an IoT server connected to the server through the communication module, based on sensing information of the first external device, to determine whether or not the first external device is in a state capable of providing a response screen corresponding to the user utterance voice, if it is determined that the first external device is not in the state capable of providing the response screen, to determine one external device to display the response screen on the basis of at least one piece of the current status information of the at least one second external device or the current status information of the at least one IoT device, to obtain the response screen to the user utterance voice, and to transmit the response screen corresponding to the user utterance voice to the one external device through the communication module.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
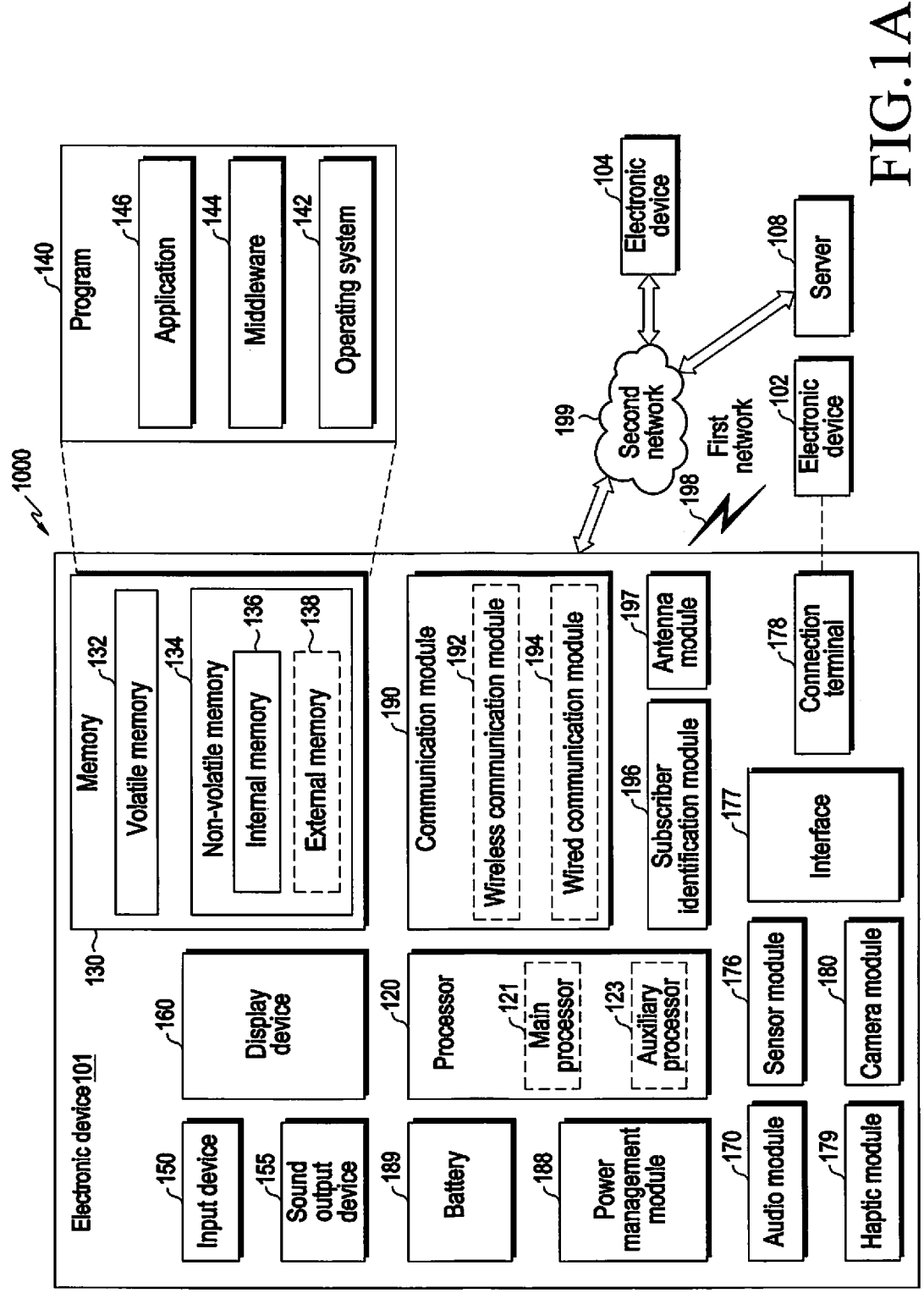
FIG. 1A is a block diagram of an electronic device in a network environment according to various embodiments.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Various embodiments are intended to provide a method for providing a screen in an artificial intelligence virtual assistant service, which enables the user to be provided with visual information using other electronic devices around the user even when the user is unable to view a display of an electronic device, and to further provide a user terminal device and a server supporting the same.

In order to recognize a user's voice and analyze the intention of the user to obtain a response, a method for providing a screen by a user terminal device or a server in an artificial intelligence virtual assistant service may include receiving a user utterance voice signal from an external device through a communication module or receiving a voice signal, which is an analog signal, through a microphone, and converting the voice into computer-readable text using an automatic speech recognition (ASR) model. The converted text may be analyzed using a natural language understanding (NLU) model to obtain the utterance intention of the user. According to an embodiment, the ASR model or the NLU model may include an artificial intelligence model.

According to an embodiment, the artificial intelligence model may be processed by an artificial intelligence-dedicated processor designed in a hardware structure specialized for processing the artificial intelligence model. Artificial intelligence models may be produced through learning. Producing the artificial intelligence models through learning may indicate that predefined operation rules or artificial intelligence models, which are configured to perform desired characteristics (or purposes), are produced by an operation in which a basic artificial intelligence model performs learning by a learning algorithm using multiple pieces of learning data.

According to an embodiment, the artificial intelligence model may be configured as a plurality of neural network layers. Each of the plurality of neural network layers may have a plurality of weight values, and may perform a neural network operation through an operation between the result of a previous layer and the plurality of weight values.

Linguistic understanding may indicate the technology of recognizing, applying, and/or processing human language and/or characters, and may include natural language processing, machine translation, a dialog system, question answering, speed recognition, and/or speech synthesis.

FIG. 1A is a block diagram illustrating an electronic device 101 in a network environment 1000 according to various embodiments. Referring to FIG. 1A, the electronic device 101 in the network environment 1000 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 1B:
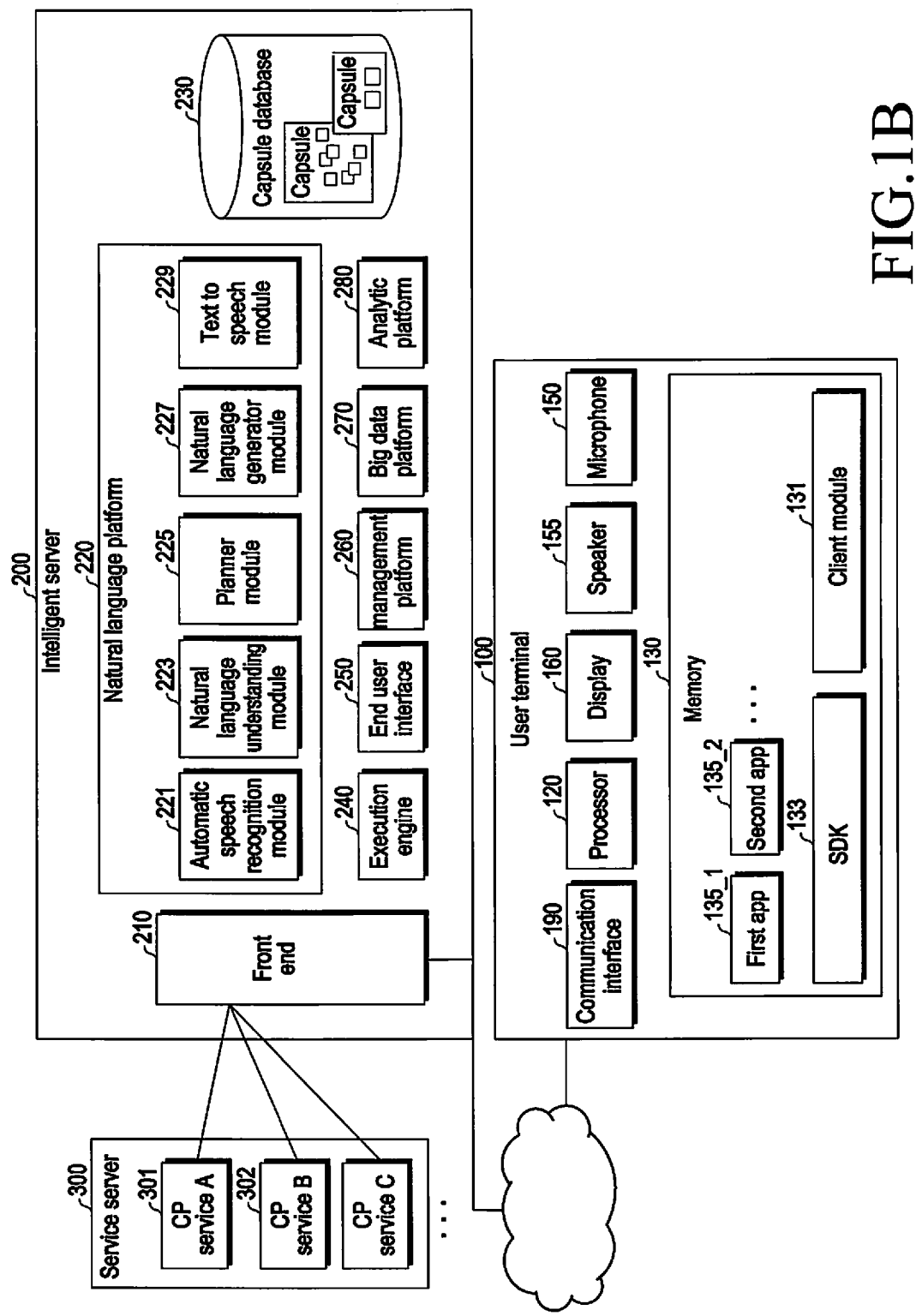
FIG. 1B is a block diagram illustrating an integrated intelligence system according to an embodiment.

FIG. 1B is a block diagram illustrating an integrated intelligence system according to an embodiment.

Referring to FIG. 1B, the integrated intelligence system according to an embodiment may include a user terminal 100, an intelligent server 200, and a service server 300.

The user terminal 100 (e.g., the electronic device 101 in FIG. 1B) according to an embodiment may be a terminal device (or an electronic device) connectable to the Internet, such as mobile phones, smart phones, personal digital assistants (PDAs), notebook computers, TV sets, home appliances, wearable devices, HMDs, or smart speakers.

According to the illustrated embodiment, the user terminal 100 may include a communication module 190, a microphone 150, a speaker 155, a display 160, a memory 130, or a processor 120. The elements listed above may be operatively or electrically connected to each other.

The communication module 190 (e.g., the communication module 190 in FIG. 1A) according to an embodiment may be configured to transmit and receive data while being connected to an external device. The microphone 150 (e.g., the input module 150 in FIG. 1A) according to an embodiment may receive sound (e.g., a user utterance), and may convert the same into an electrical signal. The speaker 155 (e.g., the sound output module 155 in FIG. 1A) according to an embodiment may output an electrical signal in the form of sound (e.g., voice). The display 160 (e.g., the display module 160 in FIG. 1A) according to an embodiment may be configured to display images or videos. The display 160 according to an embodiment may display graphic user interfaces (GUIs) of executed apps (or application programs).

The memory 130 (e.g., the memory 130 in FIG. 1A) according to an embodiment may store a client module 131, a software development kit (SDK) 133, and a plurality of apps 135. The client module 131 and the SDK 133 may configure a framework (or a solution program) for executing general functions. In addition, the client module 131 or the SDK 133 may configure a framework for processing a voice input.

In the memory 130 of an embodiment, the plurality of apps 135 may be programs for executing specified functions. According to an embodiment, the plurality of apps 135 may include a first app 135_1 and a second app 135_2. According to an embodiment, each of the plurality of apps 135 may include a plurality of operations for performing specified functions. For example, the apps may include an alarm app, a message app, and/or a schedule app. According to an embodiment, the plurality of apps 135 may be executed by the processor 120 (e.g., the provide 120 in FIG. 1A), thereby sequentially executing at least some of the plurality of operations.

The processor 120 in an embodiment may control the overall operation of the user terminal 100. For example, the processor 120 may be electrically connected to the communication module 190, the microphone 150, the speaker 155, and the display 160, and may perform specified operations.

The processor 120 in an embodiment may also execute a program stored in the memory 130 to perform a specified function. For example, the processor 120 may execute at least one of the client module 131 or the SDK 133, thereby performing the following operation for processing a voice input. The processor 120, for example, may control the operation of the plurality of apps 135 through the SDK 133. The following operation described as the operation of the client module 131 or the SDK 133 may be the operation executed by the processor 120.

The client module 131 according to an embodiment may receive a voice input. For example, the client module 131 may receive a voice signal corresponding to a user utterance detected through the microphone 150. The client module 131 may transmit the received voice input to the intelligent server 200 (e.g., the server 108 in FIG. 1A). The client module 131 may transmit status information of the user terminal 100 to the intelligent server 200 along with the received voice input. The status information, for example, may be information on the execution status of the app.

The client module 131 according to an embodiment may receive a result corresponding to the received voice input. For example, if the intelligent server 200 is able to produce a result corresponding to the received voice input, the client module 131 may receive the result corresponding to the received voice input. The client module 131 may display the received result on the display 160.

The client module 131 according to an embodiment may receive a plan corresponding to the received voice input. The client module 131 may display results of executing a plurality of operations of the app according to the plan on the display 160. The client module 131, for example, may sequentially display the execution results of the plurality of operations on the display. Additionally or alternatively, the user terminal 100 may display only some of the execution results of the plurality of operations (e.g., the result of the last operation) on the display.

According to an embodiment, the client module 131 may receive, from the intelligent server 200, a request for obtaining information required to produce the result corresponding to the voice input. According to an embodiment, the client module 131 may transmit the required information to the intelligent server 200 in response to the request.

The client module 131 according to an embodiment may transmit information on the results of executing a plurality of operations according to the plan to the intelligent server 200. The intelligent server 200 may identify that the received voice input has been correctly processed through the result information.

The client module 131 according to an embodiment may include a speech recognition module. According to an embodiment, the client module 131 may recognize a voice input performing a limited function through the speech recognition module. For example, the client module 131 may perform an intelligent app for processing a voice input for executing collaborative operations through a specified input (e.g., "Wake up!").

The intelligent server 200 according to an embodiment may receive information related to a user voice input from the user terminal 100 through a communication network. According to an embodiment, the intelligent server 200 may convert data related to the received voice input into text data. According to an embodiment, the intelligent server 200 may produce a plan for performing a task corresponding to the user voice input on the basis of the text data.

According to an embodiment, the plan may be produced by an artificial intelligence (AI) system. The artificial intelligence system may be a rule-based system, or may be a neural network-based system {e.g., a feedforward neural network (FNN) or a recurrent neural network (RNN)}. Alternatively, the artificial intelligence system may be a combination of the above systems, or may be another artificial intelligence system. According to an embodiment, the plan may be selected from a set of predefined plans, or may be produced in real time in response to a request by the user. For example, the artificial intelligence system may select at least one plan from among a plurality of predefined plans.

The intelligent server 200 according to an embodiment may transmit a result according to the produced plan to the user terminal 100, or may transmit the produced plan to the user terminal 100. According to an embodiment, the user terminal 100 may display the result according to the plan on the display. According to an embodiment, the user terminal 100 may display the result of executing the operation according to the plan on the display.

The intelligent server 200 according to an embodiment may include a front end 210, a natural language platform 220, a capsule database (DB) 230, an execution engine 240, an end user interface 250, a management platform 260, a big data platform 270, or an analytic platform 280.

The front end 210 according to an embodiment may receive a voice input from the user terminal 100. The front end 210 may transmit a response to the voice input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The automatic speech recognition module 221 according to an embodiment may convert a voice input received from the user terminal 100 into text data. The natural language understanding module 223 according to an embodiment may recognize the intention of the user using the text data of the voice input. For example, the natural language understanding module 223 may perform a syntactic analysis or a semantic analysis, thereby recognizing the intention of the user. The natural language understanding module 223 according to an embodiment may recognize the meaning of a word extracted from the voice input using the linguistic features (e.g., syntactic elements) of morphemes or phrases, and may match the recognized meaning of the word to the intention, thereby determining the intention of the user.

The planner module 225 according to an embodiment may produce a plan using the intention determined in the natural language understanding module 223 and parameters. According to an embodiment, the planner module 225 may determine a plurality of domains required to perform the task on the basis of the determined intention. The planner module 225 may determine a plurality of operations included in each of a plurality of domains determined based on the intention. According to an embodiment, the planner module 225 may determine parameters required to execute the plurality of determined operations or result values output by executing the plurality of operations. The parameter and the result values may be defined as concepts of a designated format (or class). Accordingly, the plan may include a plurality of operations determined based on the intention of the user, and a plurality of concepts. The planner module 225 may determine the relationship between the plurality of operations and the plurality of concepts by stages (or hierarchically). For example, the planner module 225 may determine the order of executing a plurality of operations determined based on the intention of the user on the basis of the plurality of concepts. In other words, the planner module 225 may determine the order of executing a plurality of operations on the basis of the parameters necessary for the execution of the plurality of operations and the results output by execution of the plurality of operations. Accordingly, the planner module 225 may produce a plan including relationship information (e.g., ontology information) between a plurality of operations and a plurality of concepts. The planner module 225 may produce a plan using information stored in the capsule database 230 that stores a set of relationships between concepts and operations.

The natural language generator module 227 according to an embodiment may convert specified information into text. The information converted into the text may be in the form of a natural language utterance. The text-to-speech module 229 according to an embodiment may convert information in the form of text into information in the form of a voice.

According to an embodiment, some or all of the functions of the natural language platform 220 may be implemented in the user terminal 100 as well.

The capsule database 230 may store information on the relationship between a plurality of concepts and operations corresponding to a plurality of domains. The capsule according to an embodiment may include a plurality of action objects (or action information) and concept objects (concept information) included in the plan. According to an embodiment, the capsule database 230 may store a plurality of capsules in the form of a concept action network (CAN). According to an embodiment, a plurality of capsules may be stored in a function registry included in the capsule data 230.

The capsule database 230 may include a strategy registry that stores strategy information required to determine the plan corresponding to the voice input. If there is a plurality of plans corresponding to the voice input, the strategy information may include reference information for determining one plan. According to an embodiment, the capsule database 230 may include a follow-up registry that stores information on subsequent operations in order to propose the subsequent operation to the user in a specified situation. The subsequent operations may include, for example, subsequent utterance. According to an embodiment, the capsule database 230 may include a layout registry that stores information on the layout of information output through the user terminal 100. According to an embodiment, the capsule database 230 may include a vocabulary registry that stores vocabulary information included in the capsule information. According to an embodiment, the capsule database 230 may include a dialog registry that stores information on the dialogs (or interactions) with the user. The capsule database 230 may update the stored objects through a developer tool. The developer tool may include, for example, a function editor for updating the action objects or the concept objects. The developer tool may include a vocabulary editor for updating vocabulary. The developer tool may include a strategy editor for producing and registering the strategy for determining the plan. The developer tool may include a dialog editor for producing a dialog with the user. The developer tool may include a follow-up editor capable of activating a subsequent goal and editing a subsequent utterance that provides hints. The subsequent goal may be determined based on the currently configured goal, user preference, or environmental conditions. In an embodiment, the capsule data 230 may also be implemented in the user terminal 100.

The execution engine 240 according to an embodiment may produce a result using the produced plan. The end user interface 250 may transmit the produced result to the user terminal 100. Accordingly, the user terminal 100 may receive the result, and may provide the received result to the user. The management platform 260 according to an embodiment may manage information used in the intelligent server 200. The big data platform 270 in an embodiment may collect user data. The analytic platform 280 according to an embodiment may manage the quality of service (QoS) of the intelligent server 200. For example, the analytic platform 280 may manage the components and the processing speed (or efficiency) of the intelligent server 200.

The service server 300 according to an embodiment may provide a specified service (e.g., order food or reserve hotel) to the user terminal 100. According to an embodiment, the service server 300 may be a server operated by a third party. The service server 300 according to an embodiment may provide the intelligent server 200 with information for producing the plan corresponding to the received voice input. The provided information may be stored in the capsule database 230. In addition, the service server 300 may provide information on the result according to the plan to the intelligent server 200.

In the integrated intelligence system described above, the user terminal 100 may provide various intelligent services to the user in response to a user input. The user input, for example, may include an input through a physical button, a touch input, or a voice input.

In an embodiment, the user terminal 100 may provide speech recognition services through an intelligent app (or a speech recognition app) stored therein. In this case, for example, the user terminal 100 may recognize a user utterance or a voice input received through the microphone, and may provide a service corresponding to the recognized voice input to the user.

In an embodiment, the user terminal 100 may perform a specified operation alone or together with the intelligent server and/or the service server on the basis of the received voice input. For example, the user terminal 100 may execute an app corresponding to the received voice input, and may perform a specified operation through the executed app.

In an embodiment, in the case in which the user terminal 100 provides a service together with the intelligent server 200 and/or the service server, the user terminal may detect a user utterance using the microphone 150, and may generate a signal (or voice data) corresponding to the detected user utterance. The user terminal may transmit the voice data to the intelligent server 200 using the communication module 190.

In response to the voice input received from the user terminal 100, the intelligent server 200 according to an embodiment may produce a plan for performing the task corresponding to the voice input, or results of performing the operation according to the plan. The plan may include, for example, a plurality of operations for performing the task corresponding to the user voice input and a plurality of concepts related to the plurality of operations. The concepts may be defined as parameters that are input for execution of the plurality of operations or result values that are output by execution of the plurality of operations. The plan may include information on the relationship between the plurality of operations and the plurality of concepts.

The user terminal 100 according to an embodiment may receive the response using the communication module 190. The user terminal 100 may output a voice signal generated inside the user terminal 100 to the outside using the speaker 155, or may output an image produced inside the user terminal 100 to the outside using the display 160.

Figure 2:
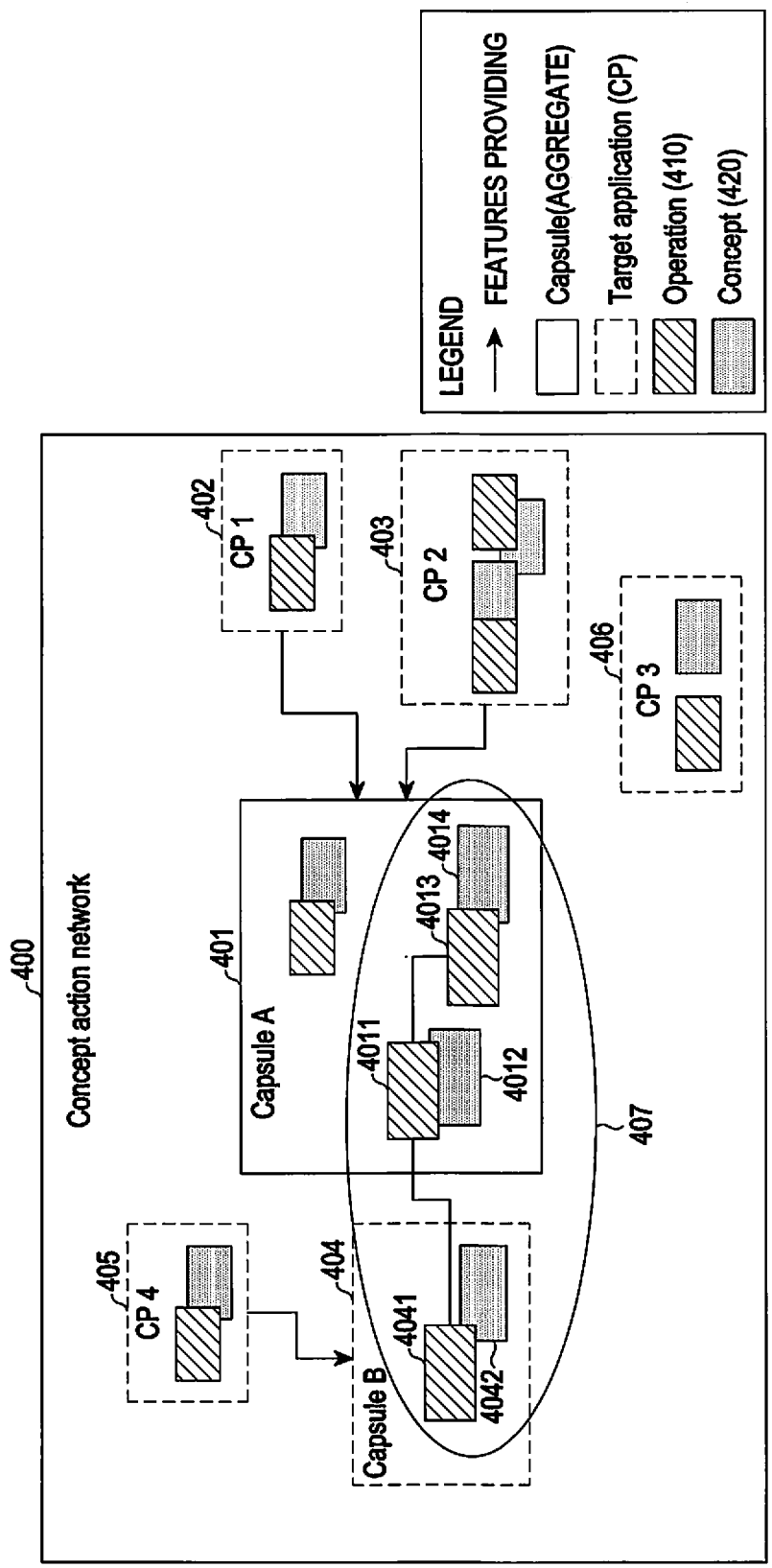
FIG. 2 is a diagram illustrating the state in which relationship information between concepts and actions is stored in a database according to an embodiment.

FIG. 2 is a diagram illustrating the state in which relationship information between concepts and operations is stored in a database according to various embodiments.

A capsule database (e.g., the capsule database 230) of the intelligent server 200 may store capsules in the form of a concept action network (CAN). The capsule database may store operations for processing the tasks corresponding to the user voice inputs and parameters required for the operations in the form of a CAN.

The capsule database may store a plurality of capsules (capsule A 401 and capsule B 404) corresponding to respective domains (e.g., applications). According to an embodiment, one capsule (e.g., capsule A 401) may correspond to one domain (e.g., a location (geo) or an application). In addition, one capsule may correspond to at least one service provider (e.g., CP 1 402 or CP 2 403) for performing a function for the domain related to the capsule. According to an embodiment, one capsule may include one or more operations 4100 and one or more concepts 4200 in order to perform specified functions.

The natural language platform 220 may produce a plan for performing a task corresponding to the received voice input using the capsules stored in the capsule database. For example, the planner module 225 of the natural language platform may produce a plan using the capsules stored in the capsule database. For example, a plan 407 may be produced using operations 4011 and 4013 and concepts 4012 and 4014 of capsule A 401, and an operation 4041 and a concept 4042 of capsule B 404.

Figure 3:
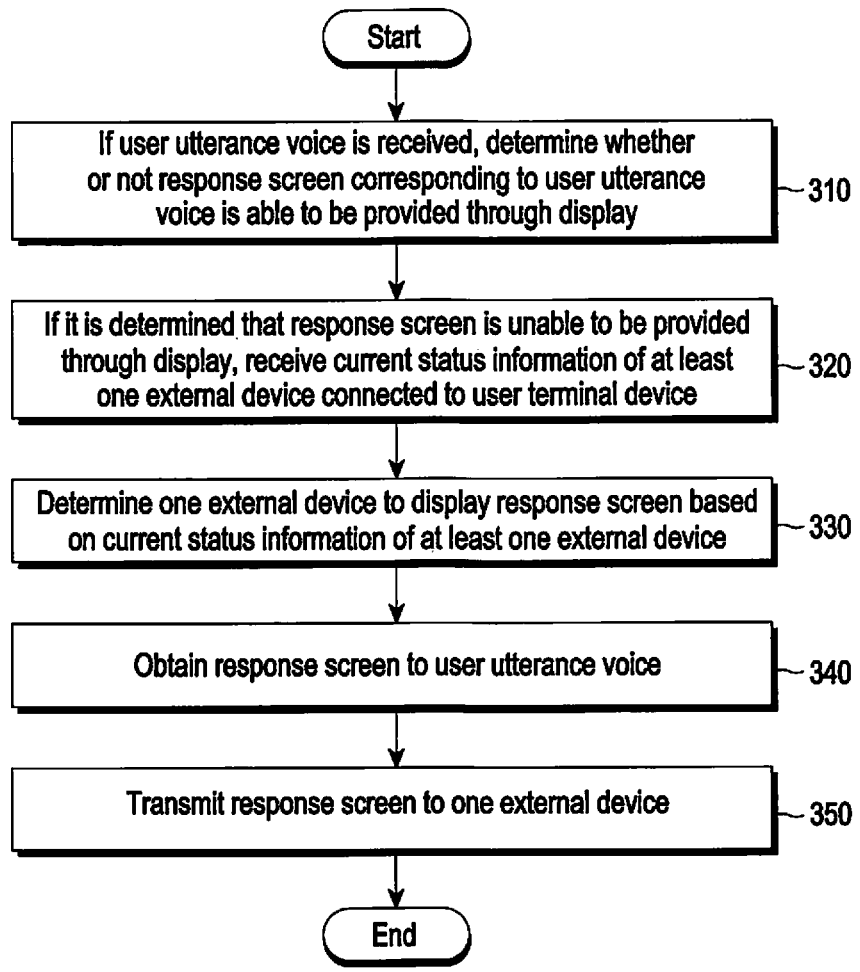
FIG. 3 is a diagram illustrating an operation of providing a screen by a user terminal device in an artificial intelligence virtual assistant service according to an embodiment.

FIG. 3 is a diagram illustrating an operation of providing a screen by a user terminal device in an artificial intelligence virtual assistant service according to an embodiment.

According to various embodiments, in operation 310, if a user utterance voice is received, a user terminal device (e.g., the processor 120 of the electronic device 101 in FIG. 1A or the processor 120 of the user terminal device 100 in FIG. 1B) may determine whether or not a response screen corresponding to the user utterance voice is able to be provided through a display (e.g., the display 160). According to various embodiments, the user terminal device 100 (e.g., the processor 120 of the electronic device 101 in FIG. 1A or the processor 120 of the user terminal device 100 in FIG. 1B) may receive a user utterance voice through a microphone (e.g., the microphone 150) included therein or an external microphone connected thereto. For example, the connected external microphone may be a microphone included in a wearable device (e.g., wireless earphones) already connected to the user terminal device 100 through wireless communication.

According to various embodiments, when the user utterance voice is received, the user terminal device 100 (e.g., the processor 120 of the electronic device 101 in FIG. 1A or the processor 120 of the user terminal device 100 in FIG. 1B) may determine whether or not the response screen corresponding to the user utterance voice is able to be provided through the display 160 on the basis of at least one of a sensed value obtained from at least one sensor or an inactive period of the display 160. According to various embodiments, the user terminal device 100 (e.g., the processor 120 of the electronic device 101 in FIG. 1A or the processor 120 of the user terminal device 100 in FIG. 1B) may include at least one sensor. For example, at least one sensor may detect the operating state (e.g., power or temperature) of the user terminal device 100 or the external environmental state (e.g., the user state), and may generate an electrical signal or a data value corresponding to the detected state. For example, the at least one sensor may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

For example, if at least one of conditions in which a sensed value obtained through an illuminance sensor included therein is less than a predetermined value, in which a sensed value obtained through a proximity sensor is less than a predetermined value, or in which the display 160 remains in an inactive state for a predetermined period or more is satisfied, the user terminal device 100 (e.g., the processor 120 of the electronic device 101 in FIG. 1A or the processor 120 of the user terminal device 100 in FIG. 1B) may determine that the response screen corresponding to the user utterance voice is unable to be provided through the display 160 (e.g., the state in which the device is inside a bag or pocket). According to various embodiments, the user terminal device 100 (e.g., the processor 120 of the electronic device 101 in FIG. 1A or the processor 120 of the user terminal device 100 in FIG. 1B) may obtain the distance to the user on the basis of at least one of the intensity of the user utterance voice received through the microphone included therein or the strength of a signal {e.g., an ultra-wideband (UWB) signal or a Bluetooth signal) from a wearable device already connected through wireless communication, and may determine whether or not the response screen corresponding to the user utterance voice is able to be provided through the display 160 by further considering the obtained distance to the user.

According to various embodiments, in operation 320, if it is determined that the response screen is unable to be provided through the display 160, the user terminal device 100 (e.g., the processor 120 of the electronic device 101 in FIG. 1A or the processor 120 of the user terminal device 100 in FIG. 1B) may receive current status information of at least one external device connected to the user terminal device 100. For example, the user terminal device 100 (e.g., the processor 120 of the electronic device 101 in FIG. 1A or the processor 120 of the user terminal device 100 in FIG. 1B) may receive, from each external device connected to the user terminal device 100, current status information including at least one of a running application, whether or not a video is being played, strength of a communication signal (e.g., a Wi-Fi signal, a UWB signal, a Bluetooth™ signal, or a Bluetooth™ low energy (BLE) signal), or a battery level.

According to various embodiments, at least one external device connected to the user terminal device 100 may be an electronic device including a display, such as a tablet PC, a smart refrigerator, a smart watch, smart glasses, or a smart TV set. Additionally or alternatively, at least one external device connected to the user terminal device 100 may be an IoT server connected to at least one IoT device including a display.

According to various embodiments, in operation 330, the user terminal device 100 (e.g., the processor 120 of the electronic device 101 in FIG. 1A or the processor 120 of the user terminal device 100 in FIG. 1B) may determine one external device to display the response screen on the basis of the current status information of at least one external device. For example, if an external device is currently displaying a screen according to execution of an application or is currently playing video content, or if the strength of a communication signal and the battery level of the external device are less than predetermined values, the user terminal device 100 (e.g., the processor 120 of the electronic device 101 in FIG. 1A or the processor 120 of the user terminal device 100 in FIG. 1B) may determine that the external device is unable to display the response screen. For example, the user terminal device 100 (e.g., the processor 120 of the electronic device 101 in FIG. 1A or the processor 120 of the user terminal device 100 in FIG. 1B) may determine the external device whose display is available, whose battery level is a predetermined value or more, and whose strength of a communication signal is a maximum, among one or more external devices, to be one external device to display the response screen.

According to various embodiments, if a user utterance voice is received through an external microphone connected to the user terminal device 100, the user terminal device 100 (e.g., the processor 120 of the electronic device 101 in FIG. 1A or the processor 120 of the user terminal device 100 in FIG. 1B) may further consider the location of the external microphone that obtained the user utterance voice, thereby determining one external device to display the response screen. For example, the user terminal device 100 (e.g., the processor 120 of the electronic device 101 in FIG. 1A or the processor 120 of the user terminal device 100 in FIG. 1B) may determine the external device closest to the location of the external microphone, among one or more external devices, to be the external device to display the response screen.

According to various embodiments, in operation 340, the user terminal device 100 (e.g., the processor 120 of the electronic device 101 in FIG. 1A or the processor 120 of the user terminal device 100 in FIG. 1B) may obtain response screen to the user utterance voice. According to various embodiments, the user terminal device 100 (e.g., the processor 120 of the electronic device 101 in FIG. 1A or the processor 120 of the user terminal device 100 in FIG. 1B) may include an automatic voice recognition module, a natural language understanding module, and a natural language generator module.

According to various embodiments, the user terminal device 100 (e.g., the processor 120 of the electronic device 101 in FIG. 1A or the processor 120 of the user terminal device 100 in FIG. 1B) may obtain response text to the user utterance voice received using the automatic voice recognition module, the natural language understanding module, and the natural language generator module. For example, in order for the user terminal device 100 to obtain a response to the voice, for the user utterance voice associated with the task stored in a memory (e.g., the memory 130) of the user terminal device 100, the user terminal device 100 (e.g., the processor 120 of the electronic device 101 in FIG. 1A or the processor 120 of the user terminal device 100 in FIG. 1B) may obtain a response through the voice recognition module, the natural language understanding module, and the natural language generator module included in the processor 120. For example, the obtained response may be response text to the user utterance voice. According to various embodiments, the automatic voice recognition module, the natural language understanding module, and the natural language generator module included in the processor 120 may perform at least some of the operations of the automatic voice recognition module 221, the natural language understanding module 223, and the natural language generator module 227 shown in FIG. 1B.

According to various embodiments, if a user utterance voice related to the task that is not stored in the memory 130 is received, or if a user utterance voice having a predetermined length or more is received, the user terminal device 100 (e.g., the processor 120 of the electronic device 101 in FIG. 1A or the processor 120 of the user terminal device 100 in FIG. 1B) may transmit the user utterance voice to a server (e.g., the intelligent server 200) for processing the voice. According to various embodiments, the user terminal device 100 (e.g., the processor 120 of the electronic device 101 in FIG. 1A or the processor 120 of the user terminal device 100 in FIG. 1B) may receive, from the server (e.g., the intelligent server 200), a response screen to the transmitted user utterance voice. An embodiment of obtaining the response to the user utterance voice through the server will be described below with reference to FIGS. 5 to 8.

According to various embodiments, the user terminal device 100 (e.g., the processor 120 of the electronic device 101 in FIG. 1A or the processor 120 of the user terminal device 100 in FIG. 1B) may produce a response screen on the basis of the obtained response text and/or information on a display included in the one determined external device. For example, if the obtained response text is intended to request a response from the user, the user terminal device 100 (e.g., the processor 120 of the electronic device 101 in FIG. 1A or the processor 120 of the user terminal device 100 in FIG. 1B) may produce a response screen by further including a plurality of examples for selection by the user. Additionally or alternatively, the user terminal device 100 (e.g., the processor 120 of the electronic device 101 in FIG. 1A or the processor 120 of the user terminal device 100 in FIG. 1B) may produce a response screen by further including visual content related to the obtained response text.

According to various embodiments, the user terminal device 100 (e.g., the processor 120 of the electronic device 101 in FIG. 1A or the processor 120 of the user terminal device 100 in FIG. 1B) may produce a response screen on the basis of information about a display included in one determined external device (e.g., a size, a shape, or displayable colors of the display).

According to various embodiments, in operation 350, the user terminal device 100 (e.g., the processor 120 of the electronic device 101 in FIG. 1A or the processor 120 of the user terminal device 100 in FIG. 1B) may transmit the response screen to one determined external device. According to various embodiments, the one determined external device may display the received response screen on the display included therein.

According to various embodiments, the user terminal device 100 (e.g., the processor 120 of the electronic device 101 in FIG. 1A or the processor 120 of the user terminal device 100 in FIG. 1B) may output a response voice through a speaker (e.g., the sound output module 155 in FIG. 1A or the speaker 155 in FIG. 1B) included in the user terminal device 100 or an external speaker connected thereto. For example, the external speaker may be the speaker included in a wearable device already connected to the user terminal device 100 through wireless communication. According to various embodiments, the response voice may include information on the external device in order to allow the user to view the external device. Accordingly, the user may view the response screen displayed on the external device while listening to the response voice output from the user terminal device 100.

Figure 4:
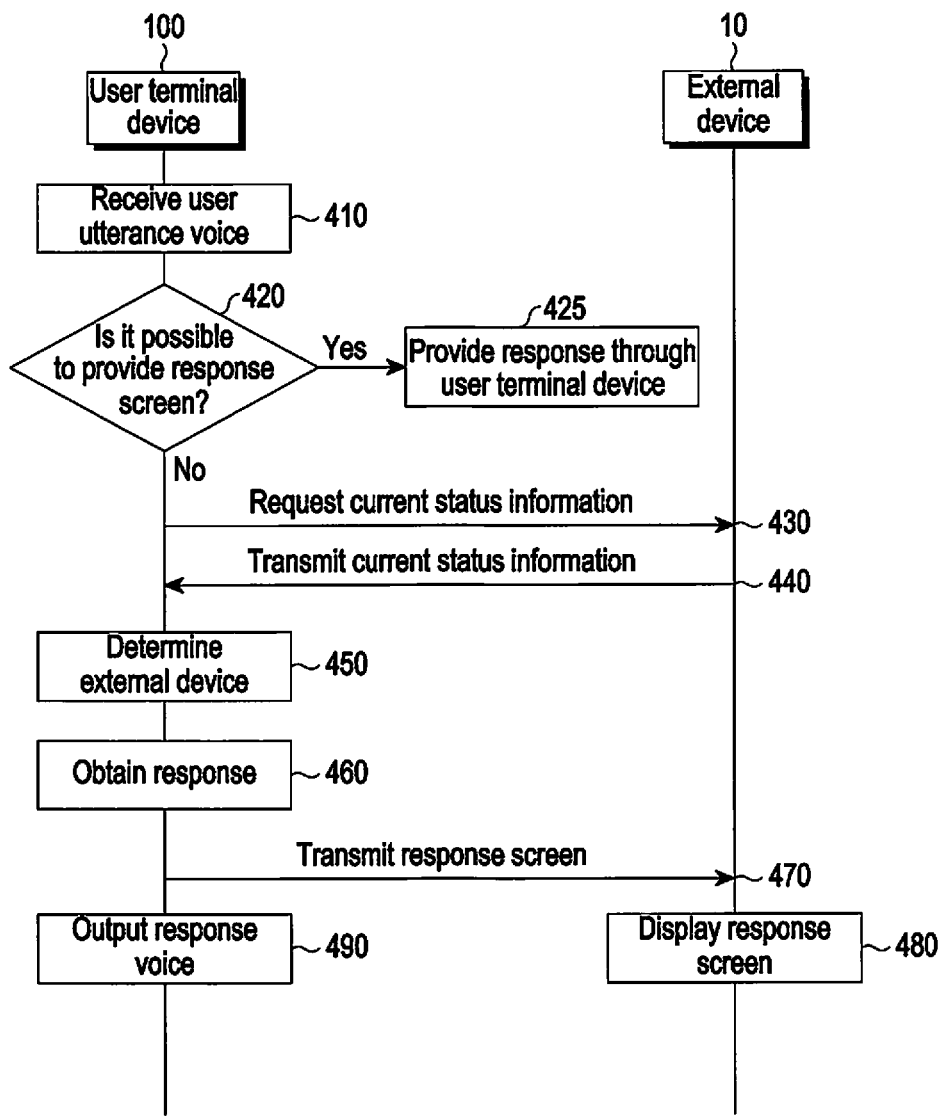
FIG. 4 is a diagram illustrating an operation of providing a screen by a user terminal device in an artificial intelligence virtual assistant service according to an embodiment.

FIG. 4 is a diagram illustrating an operation of providing a screen by a user terminal device in an artificial intelligence virtual assistant service according to an embodiment. According to various embodiments, in FIG. 4, the user terminal device 100 may perform an operation of determining an external device 10 to display a response screen and an operation of obtaining a response to a user utterance voice.

According to various embodiments, the user terminal device 100 (or an electronic device) (e.g., the processor 120 of the electronic device 101 in FIG. 1A or the processor 120 of the user terminal device 100 in FIG. 1B) may receive a user utterance voice in operation 410. According to various embodiments, in operation 420, the user terminal device 100 (e.g., the processor 120 of the electronic device 101 in FIG. 1A or the processor 120 of the user terminal device 100 in FIG. 1B) may determine whether or not user terminal device is able to provide a response screen to the user utterance voice. Since operations 410 and 420 are the same as operation 310 in FIG. 3, duplicate descriptions thereof will be omitted.

According to various embodiments, if it is determined that the user terminal device 100 (e.g., the processor 120 of the electronic device 101 in FIG. 1A or the processor 120 of the user terminal device 100 in FIG. 1B) is able to provide a response screen ("YES" in operation 420), in operation 425, the user terminal device 100 (e.g., the processor 120 of the electronic device 101 in FIG. 1A or the processor 120 of the user terminal device 100 in FIG. 1B) may determine to provide a response through the user terminal device 100 (e.g., the processor 120 of the electronic device 101 in FIG. 1A or the processor 120 of the user terminal device 100 in FIG. 1B). According to various embodiments, if it is determined that the user terminal device 100 (e.g., the processor 120 of the electronic device 101 in FIG. 1A or the processor 120 of the user terminal device 100 in FIG. 1B) is unable to provide a response screen ("NO" in operation 420), the electronic device 100 (e.g., the processor 120 of the electronic device 101 in FIG. 1A or the processor 120 of the user terminal device 100 in FIG. 1B), in operation 430, may request current status information from at least one external device (e.g., the external device 10) connected to the user terminal device 100 (e.g., the processor 120 of the electronic device 101 in FIG. 1A or the processor 120 of the user terminal device 100 in FIG. 1B).

According to various embodiments, in operation 440, the user terminal device 100 (e.g., the processor 120 of the electronic device 101 in FIG. 1A or the processor 120 of the user terminal device 100 in FIG. 1B) may receive current status information from each external device (e.g., the external device 10). For example, the current status information may include at least one of hardware information of at least one external device (e.g., at least one of identification information, model information, or capability information), a running application, whether or not video content is being played, strength of a communication signal, or a battery level in each external device (e.g., the external device 10).

Although only one external device 10 is illustrated in FIG. 4, according to various embodiments, it is possible to request current status information from two or more external devices connected to the user terminal device 100 (e.g., the processor 120 of the electronic device 101 in FIG. 1A or the processor 120 of the user terminal device 100 in FIG. 1B) and to receive current status information of two or more external devices.

According to various embodiments, in operation 450, the user terminal device 100 (e.g., the processor 120 of the electronic device 101 in FIG. 1A or the processor 120 of the user terminal device 100 in FIG. 1B) may determine the external device 10 to display the response screen corresponding to the user utterance voice on the basis of the received current status information of at least one external device. Since operation 450 is the same as operation 330 in FIG. 3, a duplicate description thereof will be omitted.

According to various embodiments, in operation 460, the user terminal device 100 (e.g., the processor 120 of the electronic device 101 in FIG. 1A or the processor 120 of the user terminal device 100 in FIG. 1B) may obtain a response to the user utterance voice. For example, the response to the user utterance voice may include at least one of a response screen and a response voice.

According to various embodiments, the user terminal device 100 (e.g., the processor 120 of the electronic device 101 in FIG. 1A or the processor 120 of the user terminal device 100 in FIG. 1B) may include an automatic speech recognition module, a natural language understanding module, and a natural language generator module. For example, if a user utterance voice related to the task stored in a memory (e.g., the memory 130 in FIG. 1A or the memory 130 in FIG. 1B) is received, or if a user voice of less than a predetermined length is received, the user terminal device 100 (e.g., the processor 120 of the electronic device 101 in FIG. 1A or the processor 120 of the user terminal device 100 in FIG. 1B) may obtain response text through the automatic speech recognition module, the natural language understanding module, and the natural language generator module, which are included therein.

According to various embodiments, if a user utterance voice related to the task that is not stored in the memory 130 is received, or if a user utterance voice having a predetermined length or more is received, the user terminal device 100 (e.g., the processor 120 of the electronic device 101 in FIG. 1A or the processor 120 of the user terminal device 100 in FIG. 1B) may transmit the user utterance voice to a server (e.g., the server 108 in FIG. 1A or the intelligent server 200 in FIG. 1B) for processing the voice. An embodiment of obtaining a response to the user utterance voice through a server will be described below with reference to FIGS. 5 to 8.

According to various embodiments, the user terminal device 100 (e.g., the processor 120 of the electronic device 101 in FIG. 1A or the processor 120 of the user terminal device 100 in FIG. 1B) may produce a response screen on the basis of the obtained response text and information on a display included in one determined external device. For example, if the obtained response text is intended to request a response from the user, the user terminal device 100 (e.g., the processor 120 of the electronic device 101 in FIG. 1A or the processor 120 of the user terminal device 100 in FIG. 1B) may produce a response screen by further including a plurality of examples for selection by the user. Additionally or alternatively, the user terminal device 100 (e.g., the processor 120 of the electronic device 101 in FIG. 1A or the processor 120 of the user terminal device 100 in FIG. 1B) may produce a response screen by further including visual content related to the obtained response text.

According to various embodiments, the user terminal device 100 (e.g., the processor 120 of the electronic device 101 in FIG. 1A or the processor 120 of the user terminal device 100 in FIG. 1B) may produce a response screen on the basis of information about a display included in one determined external device (e.g., a size, a shape, or displayable colors of the display).

According to various embodiments, the user terminal device 100 (e.g., the processor 120 of the electronic device 101 in FIG. 1A or the processor 120 of the user terminal device 100 in FIG. 1B) may include a text-to-speech module. According to various embodiments, the text-to-speech module may perform at least some operations of the text-to-speech module 229 in FIG. 1B. According to various embodiments, the user terminal device 100 (e.g., the processor 120 of the electronic device 101 in FIG. 1A or the processor 120 of the user terminal device 100 in FIG. 1B) may obtain a response voice corresponding to the response text through the text-to-speech module. According to various embodiments, the response voice may include information on the external device so as to allow the user to view the external device.

Although FIG. 4 shows that the response is obtained after determining the external device, according to various embodiments, the user terminal device 100 (e.g., the processor 120 of the electronic device 101 in FIG. 1A or the processor 120 of the user terminal device 100 in FIG. 1B) may perform the operation of obtaining the response prior to the operation of determining the external device, or may simultaneously perform at least part of the operation of obtaining the response with the operation of determining the external device (operation 450). For example, the user terminal device 100 (e.g., the processor 120 of the electronic device 101 in FIG. 1A or the processor 120 of the user terminal device 100 in FIG. 1B) may determine the external device on the basis of a result of automatic voice recognition after performing automatic voice recognition for the user utterance voice. For example, if the user utterance voice includes an external device to display a response screen as a result of performing the automatic voice recognition operation for the user utterance voice, the user terminal device 100 (e.g., the processor 120 of the electronic device 101 in FIG. 1A or the processor 120 of the user terminal device 100 in FIG. 1B) may determine the external device included in the user utterance voice to be the external device to display the response screen.

According to various embodiments, in operation 470, the user terminal device 100 (e.g., the processor 120 of the electronic device 101 in FIG. 1A or the processor 120 of the user terminal device 100 in FIG. 1B) may transmit the response screen to the determined external device 10.

According to various embodiments, the user terminal device 100 (e.g., the processor 120 of the electronic device 101 in FIG. 1A or the processor 120 of the user terminal device 100 in FIG. 1B) may output a request for confirmation from the user on whether or not to display the response screen on the determined external device 10. For example, if a tablet is determined to be the external device 10 to display the response screen, the user terminal device 100 (e.g., the processor 120 of the electronic device 101 in FIG. 1A or the processor 120 of the user terminal device 100 in FIG. 1B) may output a voice saying "Do you want to display the screen on the tablet?" through a speaker (e.g., the sound output module 155 in FIG. 1A or the speaker 155 in FIG. 1B) included in the user terminal device 100 (e.g., the processor 120 of the electronic device 101 in FIG. 1A or the processor 120 of the user terminal device 100 in FIG. 1B) or an external speaker connected to the user terminal device 100 (e.g., the processor 120 of the electronic device 101 in FIG. 1A or the processor 120 of the user terminal device 100 in FIG. 1B). According to various embodiments, when a command (e.g., a voice command) to display the response screen on the determined external device 10 is received from the user, the user terminal device 100 (e.g., the processor 120 of the electronic device 101 in FIG. 1A or the processor 120 of the user terminal device 100 in FIG. 1B) may transmit the response screen to the determined external device 10. According to another embodiment, a command (e.g., a voice command) to display the response screen through an external device other than the determined external device 10 is received from the user, the user terminal device 100 (e.g., the processor 120 of the electronic device 101 in FIG. 1A or the processor 120 of the user terminal device 100 in FIG. 1B) may transmit the response screen to the external device included in the command.

According to various embodiments, in operation 480, the external device 10 may display the response screen received from the user terminal device 100 on the display included therein.

According to various embodiments, in operation 490, the user terminal device 100 (e.g., the processor 120 of the electronic device 101 in FIG. 1A or the processor 120 of the user terminal device 100 in FIG. 1B) may output the obtained response voice through the speaker (e.g., the sound output module 155 in FIG. 1A or the speaker 155 in FIG. 1B) included in the user terminal device 100 or an external speaker connected thereto. According to various embodiments, the response voice may include information on the external device 10 so as to allow the user to view the external device 10.

According to various embodiments, after the user terminal device 100 (e.g., the processor 120 of the electronic device 101 in FIG. 1A or the processor 120 of the user terminal device 100 in FIG. 1B) transmits the response screen to the external device 10, the user may input a manipulation command through the response screen displayed on the external device 10. According to various embodiments, when the user terminal device 100 (e.g., the processor 120 of the electronic device 101 in FIG. 1A or the processor 120 of the user terminal device 100 in FIG. 1B) receives, from the external device 10, a signal corresponding to the user manipulation command input by the user, the user terminal device may perform an operation corresponding to the user manipulation command.

According to various embodiments, after the user terminal device 100 (e.g., the processor 120 of the electronic device 101 in FIG. 1A or the processor 120 of the user terminal device 100 in FIG. 1B) transmits the response screen to the external device 10, if the user terminal device switches to the state capable of providing the response screen through a display (e.g., the display module 160 in FIG. 1A or the display 160 in FIG. 1B), the user terminal device may transmit a signal for stopping the display of the response screen to the external device 10, and may display the response screen on the display (e.g., the display module 160 in FIG. 1A or the display 160 in FIG. 1B). For example, while displaying the response screen through the external device 10, if the user terminal device 100 switches to the state capable of providing the response screen through the display (e.g., the display module 160 in FIG. 1A or the display 160 in FIG. 1B) (e.g., the state in which the user terminal device is taken out of a pocket or bag) according to a sensed value obtained from at least one sensor (e.g., an illuminance sensor, a gyro sensor, or an acceleration sensor), or if the display (e.g., the display module 160 in FIG. 1A or the display 160 in FIG. 1B) is activated, the user terminal device 100 (e.g., the processor 120 of the electronic device 101 in FIG. 1A or the processor 120 of the user terminal device 100 in FIG. 1B) may transmit a signal for stopping the display of the response screen to the external device 10, and may display the response screen on the display (e.g., the display module 160 in FIG. 1A or the display 160 in FIG. 1B). According to various embodiments, when the user terminal device switches to the state capable of providing the response screen through the display (e.g., the display module 160 in FIG. 1A or the display 160 in FIG. 1B), the user terminal device 100 (e.g., the processor 120 of the electronic device 101 in FIG. 1A or the processor 120 of the user terminal device 100 in FIG. 1B) may receive confirmation from the user on whether or not to provide the response screen through the display (e.g., the display module 160 in FIG. 1A or the display 160 in FIG. 1B). For example, the user terminal device 100 (e.g., the processor 120 of the electronic device 101 in FIG. 1A or the processor 120 of the user terminal device 100 in FIG. 1B) may transmit a confirmation message to the external device 10 so as to display the confirmation message on the display of the external device 10, or may output a voice making a request for confirmation through a speaker (e.g., the sound output module 155 in FIG. 1A or the speaker 155 in FIG. 1B) included in the user terminal device 100 or an external speaker connected thereto. According to various embodiments, when a user command regarding whether or not to provide the response screen through the display (e.g., the display module 160 in FIG. 1A or the display 160 in FIG. 1B) is input, the user terminal device 100 (e.g., the processor 120 of the electronic device 101 in FIG. 1A or the processor 120 of the user terminal device 100 in FIG. 1B) may maintain the response screen displayed in the external device 10, or may display the response screen on the display (e.g., the display module 160 in FIG. 1A or the display 160 in FIG. 1B) on the basis of the input user command.

Figure 5:
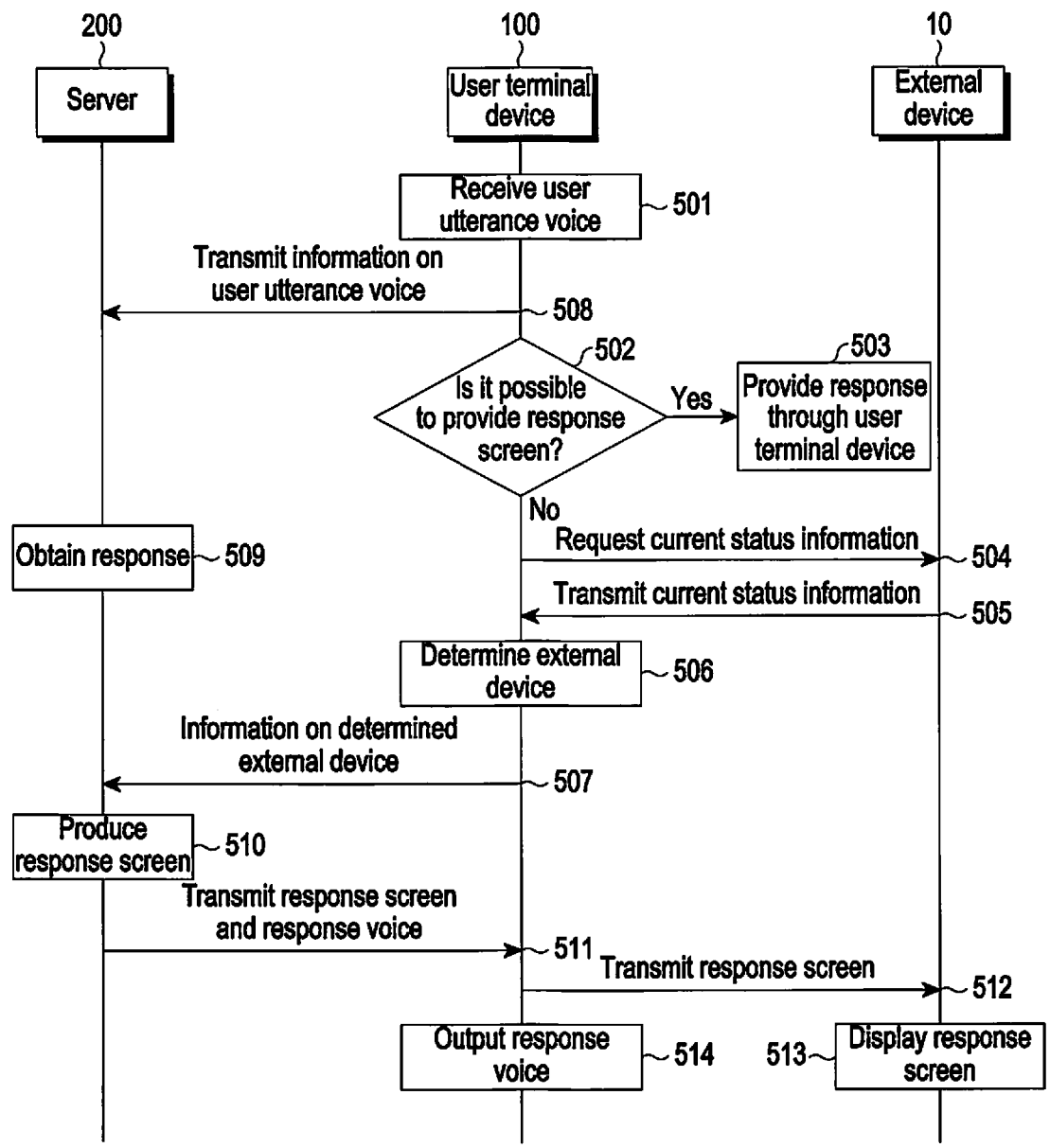
FIG. 5 is a diagram illustrating an operation of providing a screen by a user terminal device in an artificial intelligence virtual assistant service according to an embodiment.

FIG. 5 is a diagram illustrating an operation of providing a screen by a user terminal device in an artificial intelligence virtual assistant service according to an embodiment. According to various embodiments, FIG. 5 shows an operation in which a user terminal device 100 determines an external device 10 to display a response screen and an operation in which a server 200 obtains a response to a user utterance voice.

According to various embodiments, in operation 501, the user terminal device 100 (or an electronic device) (e.g., the processor 120 of the electronic device 101 in FIG. 1A or the processor 120 of the user terminal device 100 in FIG. 1B) may receive a user utterance voice. According to various embodiments, in operation 502, the user terminal device 100 (e.g., the processor 120 of the electronic device 101 in FIG. 1A or the processor 120 of the user terminal device 100 in FIG. 1B) may determine whether or not the user terminal device is able to provide a response screen to the user utterance voice.

According to various embodiments, if it is determined that the user terminal device 100 (e.g., the processor 120 of the electronic device 101 in FIG. 1A or the processor 120 of the user terminal device 100 in FIG. 1B) is able to provide the response screen ("YES" in operation 502), in operation 503, the user terminal device 100 (e.g., the processor 120 of the electronic device 101 in FIG. 1A or the processor 120 of the user terminal device 100 in FIG. 1B) may determine to provide a response through the user terminal device 100 (e.g., the processor 120 of the electronic device 101 in FIG. 1A or the processor 120 of the user terminal device 100 in FIG. 1B). According to various embodiments, if it is determined that the user terminal device 100 (e.g., the processor 120 of the electronic device 101 in FIG. 1A or the processor 120 of the user terminal device 100 in FIG. 1B) is unable to provide the response screen ("NO" in operation 502), the electronic device 100 (e.g., the processor 120 of the electronic device 101 in FIG. 1A or the processor 120 of the user terminal device 100 in FIG. 1B) may request current status information from at least one external device (e.g., the external device 10) connected to the user terminal device 100 (e.g., the processor 120 of the electronic device 101 in FIG. 1A or the processor 120 of the user terminal device 100 in FIG. 1B) in operation 504.

According to various embodiments, in operation 505, the user terminal device 100 (e.g., the processor 120 of the electronic device 101 in FIG. 1A or the processor 120 of the user terminal device 100 in FIG. 1B) may receive current status information from each external device (e.g., the external device 10). For example, the current status information may include at least one of a running application, whether or not video content is being played, strength of a communication signal, or a battery level in each external device (e.g., the external device 10).

According to various embodiments, in operation 506, the user terminal device 100 (e.g., the processor 120 of the electronic device 101 in FIG. 1A or the processor 120 of the user terminal device 100 in FIG. 1B) may determine an external device 10 to display a response screen corresponding to the user utterance voice on the basis of the received current status information of at least one external device (e.g., the external device 10). Since operations 501 to 506 are the same as operation 410 to 450 in FIG. 4, and duplicate descriptions thereof will be omitted.

According to various embodiments, in operation 507, the user terminal device 100 (e.g., the processor 120 of the electronic device 101 in FIG. 1A or the processor 120 of the user terminal device 100 in FIG. 1B) may transmit information on the determined external device to a server (e.g., the intelligent server 200). For example, the user terminal device 100 (e.g., the processor 120 of the electronic device 101 in FIG. 1A or the processor 120 of the user terminal device 100 in FIG. 1B) may transmit ID information including information on the device type of the determined external device to the server (e.g., the intelligent server 200).

According to various embodiments, the user terminal device 100 (e.g., the processor 120 of the electronic device 101 in FIG. 1A or the processor 120 of the user terminal device 100 in FIG. 1B) may output a request for confirmation from the user on whether or not to display the response screen on the determined external device 10. For example, if a tablet is determined to be the external device 10 to display the response screen, the user terminal device 100 (e.g., the processor 120 of the electronic device 101 in FIG. 1A or the processor 120 of the user terminal device 100 in FIG. 1B) may output a voice saying "Do you want to display the screen on the tablet?" through a speaker (e.g., the speaker 155) included in the user terminal device 100 (e.g., the processor 120 of the electronic device 101 in FIG. 1A or the processor 120 of the user terminal device 100 in FIG. 1B) or an external speaker connected to the user terminal device 100 (e.g., the processor 120 of the electronic device 101 in FIG. 1A or the processor 120 of the user terminal device 100 in FIG. 1B). According to various embodiments, when a command (e.g., a voice command) to display the response screen on the determined external device 10 is received from the user, the user terminal device 100 (e.g., the processor 120 of the electronic device 101 in FIG. 1A or the processor 120 of the user terminal device 100 in FIG. 1B) may transmit information on the determined external device 10 to the server (e.g., the intelligent server 200). According to another embodiment, a command (e.g., a voice command) to display the response screen through an external device other than the determined external device 10 is received from the user, the user terminal device 100 (e.g., the processor 120 of the electronic device 101 in FIG. 1A or the processor 120 of the user terminal device 100 in FIG. 1B) may transmit information on the determined external device 10 included in the command to the server (e.g., the intelligent server 200).

According to various embodiments, in operation 508, the user terminal device 100 (e.g., the processor 120 of the electronic device 101 in FIG. 1A or the processor 120 of the user terminal device 100 in FIG. 1B) may transmit information on the received user utterance voice to the server (e.g., the intelligent server 200). For example, the information on the received user utterance voice may include at least one of a user utterance voice signal, a result of automatic voice recognition of the received user utterance voice signal by the user terminal device 100 (e.g., the processor 120 of the electronic device 101 in FIG. 1A or the processor 120 of the user terminal device 100 in FIG. 1B), or a result of performing natural language understanding by the user terminal device 100 (e.g., the processor 120 of the electronic device 101 in FIG. 1A or the processor 120 of the user terminal device 100 in FIG. 1B) after automatic voice recognition of the user utterance voice signal.

According to various embodiments, in operation 509, the server (e.g., the intelligent server 200 or the processor 601) may obtain a response corresponding to the information on the received user utterance voice. For example, the response may include at least one of a response screen or a response voice.

According to various embodiments, the server (e.g., the intelligent server 200 or the processor 601) may obtain response text corresponding to the information on the received user utterance voice using a natural language platform (e.g., the natural language platform 220). For example, the server (e.g., the intelligent server 200 or the processor 601) may obtain the response text using at least one module included in the natural language platform (e.g., the natural language platform 220) on the basis of whether the information about the received user utterance voice is a user utterance voice signal, a result of automatic voice recognition of the received user utterance voice signal by the user terminal device 100 (e.g., the processor 120 of the electronic device 101 in FIG. 1A or the processor 120 of the user terminal device 100 in FIG. 1B), or a result of performing natural language understanding by the user terminal device 100 (e.g., the processor 120 of the electronic device 101 in FIG. 1A or the processor 120 of the user terminal device 100 in FIG. 1B) after automatic voice recognition of the user utterance voice signal.

Although it is described in FIG. 5 that operation 508 of transmitting information on the user utterance voice is performed after operation 501 of receiving the user utterance voice, according to various embodiments, the operation of transmitting information on the user utterance voice may be simultaneously performed with operation 507 of transmitting the determined external device. According to various embodiments, in the case where information on the user utterance voice and information on the determined external device are transmitted together, operation 509 of obtaining a response to the user utterance voice may be performed after operation 507.

According to various embodiments, in operation 510, the server (e.g., the intelligent server 200 or the processor 601) may produce a response screen on the basis of the obtained response text and the information on one determined external device. For example, the server (e.g., the intelligent server 200 or the processor 601) may produce a response screen on the basis of the obtained response text and device type information, which is included in the ID information of the determined external device.

According to various embodiments, if the obtained response text is intended to request a response from the user, the server (e.g., the intelligent server 200 or the processor 601) may produce a response screen by further including a plurality of examples for selection of the user therein. As another example, the server (e.g., the intelligent server 200 or the processor 601) may produce a response screen by further including visual content related to the obtained response text therein.

According to various embodiments, the server (e.g., the intelligent server 200 or the processor 601) may produce a response screen on the basis of information about a display included in one determined external device (e.g., a size, a shape, or displayable colors of the display). For example, if the display included in the external device has a small size, the server (e.g., the intelligent server 200 or the processor 601) may produce a response screen by shortening the response text.

According to various embodiments, the server (e.g., the intelligent server 200 or the processor 601) may obtain a response voice corresponding to the response text through a text-to-speech module (e.g., the text-to-speech module 229).

According to various embodiments, in operation 511, the server (e.g., the intelligent server 200 or the processor 601) may transmit the response screen and the response voice to the user terminal device 100.

According to various embodiments, in operation 512, the user terminal device 100 (e.g., the processor 120 of the electronic device 101 in FIG. 1A or the processor 120 of the user terminal device 100 in FIG. 1B) may transmit the response screen received from the server (e.g., the intelligent server 200) to the external device 10.

According to various embodiments, the external device 10 may display the response screen received from the user terminal device 100 in operation 513, and the user terminal device 100 (e.g., the processor 120 of the electronic device 101 in FIG. 1A or the processor 120 of the user terminal device 100 in FIG. 1B) may output the response voice in operation 514.

According to various embodiments, the server (e.g., the intelligent server 200 or the processor 601) may transmit the response text to the user terminal device 100 without converting the response text to a voice, and the user terminal device 100 (e.g., the processor 120 of the electronic device 101 in FIG. 1A or the processor 120 of the user terminal device 100 in FIG. 1B) may convert the received response text to a voice, and may output a response voice.

According to various embodiments, the response voice may include information on the external device 10 so as to allow the user to view the external device 10.

According to various embodiments, in the case where the external device 10 is able to communicate with the server (e.g., the intelligent server 200) (for example, in the case where the external device 10 communicates with the intelligent server 200 to provide the artificial intelligence virtual assistant service), the server (e.g., the intelligent server 200 or the processor 601) may transmit the response screen to the external device 10.

According to various embodiments, after the user terminal device 100 (e.g., the processor 120 of the electronic device 101 in FIG. 1A or the processor 120 of the user terminal device 100 in FIG. 1B) transmits the response screen to the external device 10, the user may input a manipulation command through the response screen displayed on the external device 10. According to various embodiments, if a signal corresponding to the user manipulation command input by the user is received from the external device 10, the user terminal device 100 (e.g., the processor 120 of the electronic device 101 in FIG. 1A or the processor 120 of the user terminal device 100 in FIG. 1B) may perform an operation corresponding to the user manipulation command.

According to various embodiments, if the user terminal device 100 (e.g., the processor 120 of the electronic device 101 in FIG. 1A or the processor 120 of the user terminal device 100 in FIG. 1B) switches to the state capable of providing a response screen through a display (e.g., the display module 160 in FIG. 1A or the display 160 in FIG. 1B) while the response screen is being displayed through the external device 10, the user terminal device may display the response screen on the display (e.g., the display module 160 in FIG. 1A or the display 160 in FIG. 1B).

For example, if the user terminal device 100 (e.g., the processor 120 of the electronic device 101 in FIG. 1A or the processor 120 of the user terminal device 100 in FIG. 1B) switches to the state capable of providing a response screen through the display (e.g., the display module 160 in FIG. 1A or the display 160 in FIG. 1B) (e.g., the state in which the user terminal device is taken out of a pocket or bag) according to a sensed value obtained from at least one sensor (e.g., an illuminance sensor, a gyro sensor, or an acceleration sensor) while displaying the response screen through the external device 10, or if the display (e.g., the display module 160 in FIG. 1A or the display 160 in FIG. 1B) is activated, the user terminal device 100 may transmit a signal for stopping the display of the response screen to the external device 10, and may display the response screen on the display (e.g., the display module 160 in FIG. 1A or the display 160 in FIG. 1B), or may request the server (e.g., the intelligent server 200) to transmit the response screen to the user terminal device 100.

According to various embodiments, when the user terminal device 100 (e.g., the processor 120 of the electronic device 101 in FIG. 1A or the processor 120 of the user terminal device 100 in FIG. 1B) switches to the state capable of providing the response screen through the display (e.g., the display module 160 in FIG. 1A or the display 160 in FIG. 1B), the user terminal device 100 may receive confirmation from the user on whether or not to provide the response screen through the display (e.g., the display module 160 in FIG. 1A or the display 160 in FIG. 1B). For example, the user terminal device 100 (e.g., the processor 120 of the electronic device 101 in FIG. 1A or the processor 120 of the user terminal device 100 in FIG. 1B) may transmit a confirmation message to the external device 10 so as to display the confirmation message on the display of the external device 10, or may output a voice making a request for confirmation through a speaker (e.g., the sound output module 155 in FIG. 1A or the speaker 155 in FIG. 1B) included in the user terminal device 100 or an external speaker connected to the user terminal device 100. According to various embodiments, when a user command regarding whether or not to provide the response screen through the display (e.g., the display 160) is input, the user terminal device 100 (e.g., the processor 120 of the electronic device 101 in FIG. 1A or the processor 120 of the user terminal device 100 in FIG. 1B) may maintain the response screen displayed by the external device 10, or may display the response screen on the display (e.g., the display module 160 in FIG. 1A or the display 160 in FIG. 1B) on the basis of the input user command.

Figure 6:
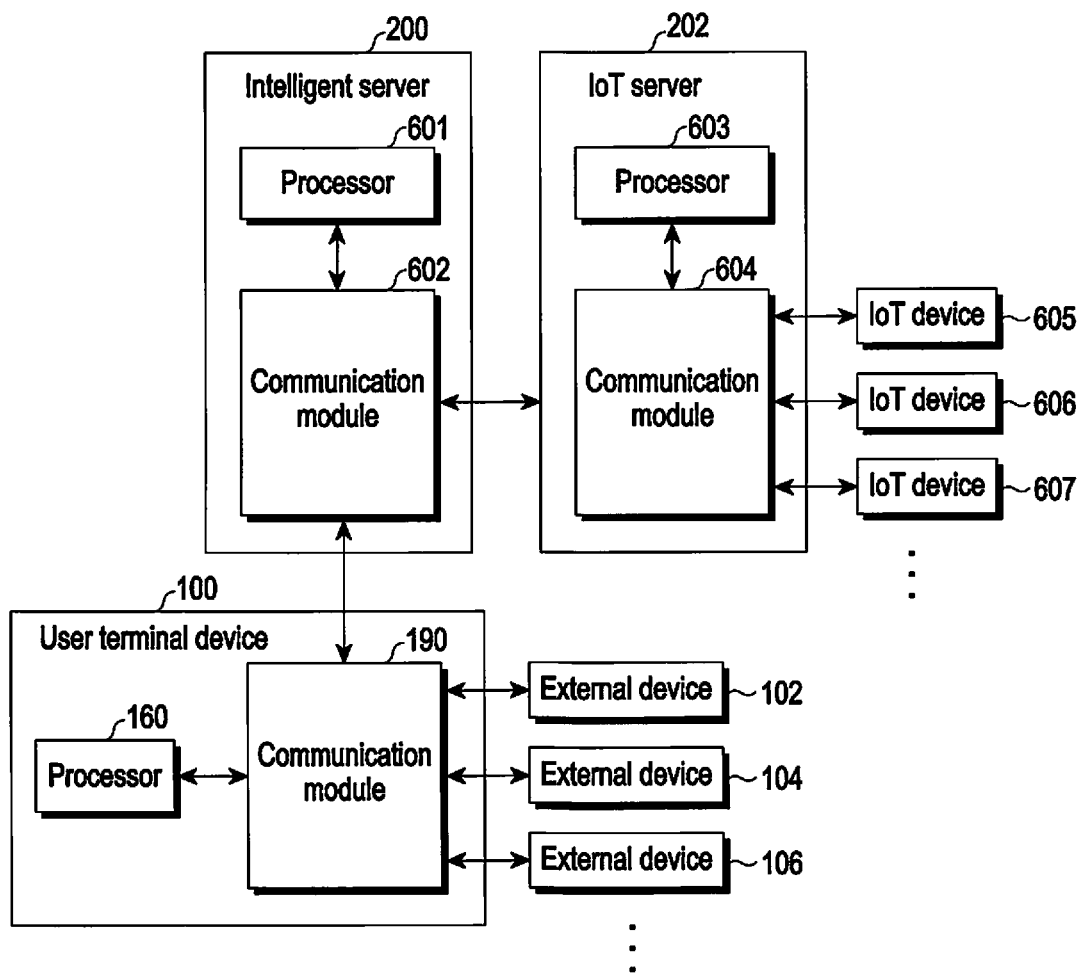
FIG. 6 is a diagram illustrating a network environment of an artificial intelligence virtual assistant service according to an embodiment.

FIG. 6 is a diagram illustrating a network environment of an artificial intelligence virtual assistant service according to an embodiment.

According to various embodiments, the network environment of the artificial intelligence virtual assistant service may include an intelligent server 200, a user terminal device (or an electronic device) 100, and an IoT server 202.

According to various embodiments, the intelligent server 200 may include a communication module 602 and a processor 601 that is operatively connected to the communication module 602. According to various embodiments, the intelligent server 200 may communicate with the IoT server 202 and the user terminal device 100 through the communication module 602.

According to various embodiments, the user terminal device 100 may include a communication module 190 (e.g., the communication module 190 in FIG. 1A or the communication module 190 in FIG. 1B) and a processor 120 that is operatively connected to the communication module 190. According to various embodiments, the user terminal device 100 may communicate with at least one external device 102, 104, or 106 through the communication module 190.

The communication module 190 may support wireless communication by device-to-device (D2D) methods such as Bluetooth™, BLE, Wi-Fi direct, Wi-Fi hot spot, a UWB signal, and wireless communication using an access point (AP) of Wi-Fi.

According to various embodiments, the user terminal device 100 may further include another element in addition to the elements shown in FIG. 6. For example, the user terminal device 100 may further include at least one sensor.

According to various embodiments, the user terminal device 100 may determine the current status information of the electronic device {for example, the state in which a response screen corresponding to a user utterance voice is unable to be provided through the display module 160 in FIG. 1A or the display 160 in FIG. 1B (e.g., the state in which the user terminal device is inside a bag or pocket)} through a sensed value obtained through at least one sensor (e.g., an illuminance sensor, a gyro sensor, or an acceleration sensor).

As another example, the user terminal device 100 may further include at least one of the elements shown in FIG. 1B (e.g., the microphone 150, the speaker 155, and the display 160). Additionally, the IoT server 202 may include a communication module 604 and a processor 603 operatively connected to the communication module 604. According to various embodiments, the IoT server 202 may communicate with at least one IoT device 605, 606, or 607 through the communication module 604.

Figure 7:
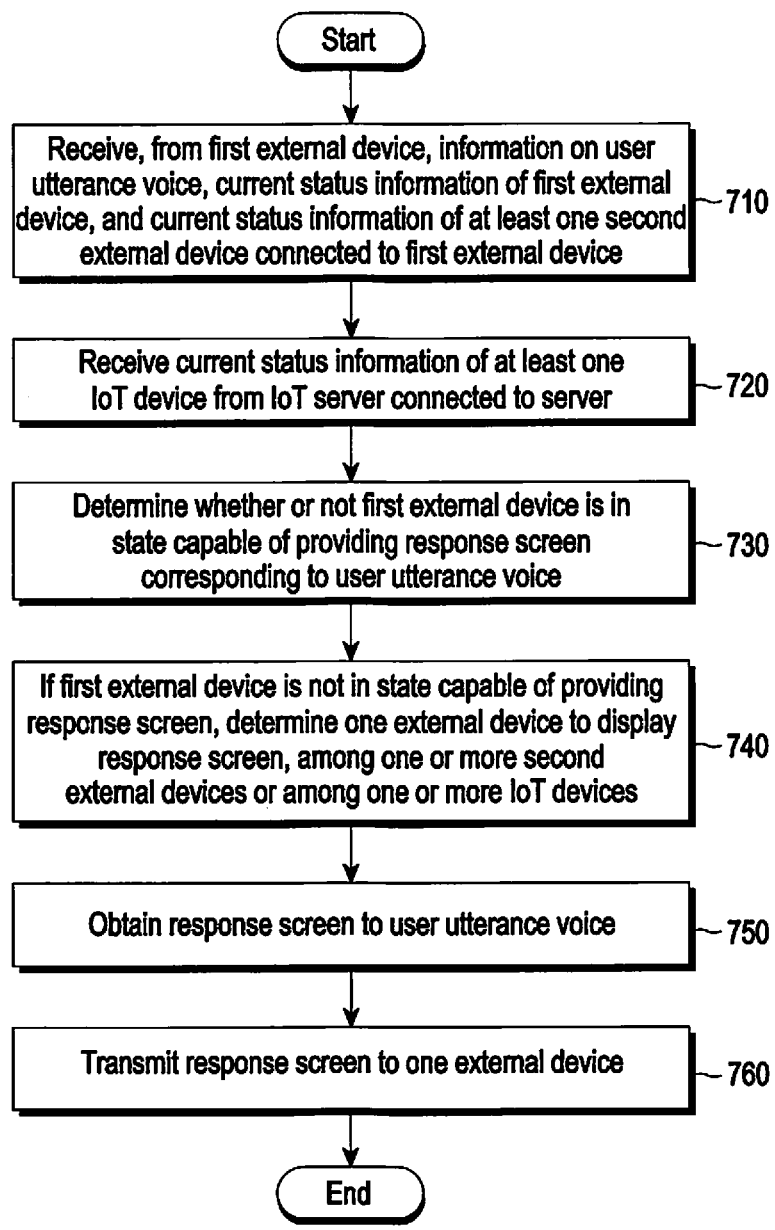
FIG. 7 is a diagram illustrating an operation of providing a screen by a server in an artificial intelligence virtual assistant service according to an embodiment.

FIG. 7 is a diagram illustrating an operation of providing a screen by a server in an artificial intelligence virtual assistant service according to an embodiment.

According to various embodiments, in operation 710, the server (e.g., the intelligent server 200 or the processor 601) may receive, from a first external device (e.g., the electronic device 101 in FIG. 1A or the user terminal device 100 in FIG. 1B), information on a user utterance voice, current status information of the first external device, and current status information of at least one second external device (e.g., the external device 104 or 106) connected to the first external device.

According to various embodiments, the information on the user utterance voice may be information on the user utterance voice received through a microphone included in the first external device or a microphone of the second external device 102 already connected to the first external device. According to various embodiments, the second external device already connected to the first external device may be a wearable device (e.g., wireless earphones).

For example, information on the user utterance voice may include a user utterance voice signal received by the first external device, a result of automatic voice recognition of the received user utterance voice signal by the first external device, or a result of performing natural language understanding by the first external device after automatic voice recognition of the user utterance voice signal.

According to various embodiments, the current status information of the first external device may include information on whether or not the first external device is able to provide a response screen through a display (e.g., the display module 160 in FIG. 1A or the display 160 in FIG. 1B) of the first external device.

According to various embodiments, the current status information of the first external device may include at least one of a sensed value obtained by the first external device or an inactivation period of a display of the first external device. For example, the current status information of the first external device may include at least one of a sensed value obtained through an illuminance sensor included in the first external device, a sensed value obtained through a proximity sensor, or an inactivation period of the display (e.g., the display module 160 in FIG. 1A or the display 160 in FIG. 1B).

According to various embodiments, the current status information of the first external device may further include the distance between the user and the first external device, which is obtained based on at least one of the intensity of the user utterance voice received through the microphone included therein or the strength of a signal (e.g., a UWB signal or a Bluetooth™ signal) with a wearable device already connected through wireless communication.

According to various embodiments, the current status information of at least one second external device (e.g., the external devices 104 and 106) connected to the first external device may include at least one of a running application, whether or not video content is being played, strength of a communication signal (e.g., a Wi-Fi signal, a UWB signal, a Bluetooth™ signal, or a BLE signal), or a battery level in each second external device.

According to various embodiments, in operation 720, the server may receive current status information of at least one IoT device (e.g., the IoT device 605, 606, or 607) from the IoT server (e.g., the IoT server 202) connected to the server. For example, the current status information of at least one IoT device may include at least one of a running application, whether or not video content is being played, strength of a communication signal (e.g., a Wi-Fi signal, a UWB signal, a Bluetooth™ signal, or a BLE signal), or a battery level in each IoT device.

According to various embodiments, in operation 730, the server may determine whether or not the first external device is in the state capable of providing a response screen corresponding to the user utterance voice. For example, the server may determine whether or not the first external device is in the state capable of providing a response screen on the basis of the current status information of the first external device.

According to various embodiments, the server determine whether or not the first external device in the state capable of providing a response screen on the basis of the information, which is included in the current status information of the first external device, on whether or not the first external device is able to provide a response screen through a display of the first external device.

According to various embodiments, if at least one of conditions in which a sensed value obtained through an illuminance sensor of the first external device is less than a predetermined value, in which a sensed value obtained through a proximity sensor of the first external device is less than a predetermined value, or in which the display of the first external device remains in an inactive state for a predetermined period or more is satisfied, the server may determine that the response screen corresponding to the user utterance voice is unable to be provided through the display of the first external device (e.g., the state in which the device is inside a bag or pocket).

According to various embodiments, if the distance between the user and the first external device, which is included in the current status information of the first external device, is greater than or equal to a predetermined value, the server may determine that the response screen corresponding to the user utterance voice is unable to be provided through the display of the first external device.

According to various embodiments, in operation 740, if the first external device is not in the state capable of providing the response screen, the server may determine one external device to display the response screen, among one or more second external devices (e.g., the external devices 104 and 106) or among one or more IoT devices (e.g., the IoT devices 605, 606, and 607).

For example, the server may determine the second external device or the IoT device, which is currently displaying a screen according to execution of an application or is currently displaying video content, or of which the strength of a communication signal and the battery level are less than predetermined values, to be the device that is unable to display the response screen. For example, the server may determine the device whose display is available, whose battery level is greater than or equal to a predetermined value, and whose communication signal is strongest, among one or more external devices or one or more IoT devices, to be one external device to display the response screen.

According to various embodiments, if the result of automatic voice recognition of the user utterance voice includes information related to a device that is to provide a response corresponding to the user utterance voice, the server may determine the device included in the user utterance voice to be the one external device to display the response screen.

According to various embodiments, in operation 750, the server may obtain a response screen to the user utterance voice. For example, the server may obtain response text corresponding to information on the received user utterance voice through an automatic speech recognition module (e.g., the automatic speech recognition module 221), a natural language understanding module (e.g., the natural language understanding module 223), or a natural language generator module (e.g., the natural language generator module 227), which are included in a natural language platform (e.g., the natural language platform 220), According to various embodiments, the server may produce a response screen on the basis of the obtained response text and information of one determined external device. For example, the server may produce a response screen on the basis of the obtained response text and the device type information of the determined external device.

According to various embodiments, if the obtained response text is intended to request a response from the user, the server may produce a response screen by further including a plurality of examples for selection by the user. As another example, the server may produce a response screen by further including visual content related to the obtained response text.

According to various embodiments, the server may produce a response screen on the basis of information about a display included in one determined external device (e.g., a size, a shape, or displayable colors of the display). For example, if the display included in the external device has a small size, the server may produce a response screen by shortening the response text.

According to various embodiments, in operation 760, the server may transmit the response screen to one determined external device.

According to various embodiments, if one determined external device supports an artificial intelligence virtual assistant function, the server may transmit the response screen to the one determined external device. Additionally, if one determined external device does not support an artificial intelligence virtual assistant function, the server may transmit the response screen to the first external device such that the first external device transmits the response screen to the one external device. For example, if one determined external device does not support an artificial intelligence virtual assistant function, the server may transmit the response screen to the first external device, and the first external device may transmit the received response screen to the one determined external device.

According to various embodiments, the server may output a request for confirmation from the user on whether or not to display the response screen on the one determined external device. For example, if a tablet is determined to be the external device to display the response screen, the server may output a voice saying "Do you want to display the screen on the tablet?" through a speaker (e.g., the sound output module 155 in FIG. 1A or the speaker 155 in FIG. 1B) included in the first external device or a speaker included in the second external device (e.g., the external device 102) already connected to the first external device. According to various embodiments, when a command (e.g., a voice command) to display the response screen on the determined external device is received from the user, the server may transmit the response screen to the determined external device. In addition, a command (e.g., a voice command) to display the response screen through an external device other than the determined external device may be received from the user, and the server may transmit the response screen to the external device included in the command.

According to various embodiments, if the first external device switches to the state capable of providing the response screen through a display (e.g., the display module 160 in FIG. 1A or the display 160 in FIG. 1B) of the first external device while displaying the response screen through the one determined external device, the server may transmit the response screen to the first external device. For example, if the user terminal device 100 switches to the state capable of providing the response screen through the display (e.g., the display module 160 in FIG. 1A or the display 160 in FIG. 1B) (e.g., the state in which the device is taken out of a pocket or bag) according to a sensed value obtained from at least one sensor (e.g., an illuminance sensor, a gyro sensor, or an acceleration sensor) of the first external device, or if a signal indicating that the display (e.g., the display module 160 in FIG. 1A or the display 160 in FIG. 1B) is activated is received, while displaying the response screen through the one determined external device, the server may transmit a signal for stopping the display of the response screen to the one determined external device, and may transmit the response screen to the first external device.

According to various embodiments, in the case where the first external device transmitted the response screen to one determined external device, if the first external device switched to the state capable of providing the response screen through the display of the first external device, the first external device may display the response screen through the display, instead of transmitting the response screen received from the server to the one determined external device. According to various embodiments, the first external device may transmit a signal for stopping the display of the response screen to the determined external device.

According to various embodiments, the user may input a manipulation command through the response screen displayed on the one determined external device while the one determined external device is displaying the response screen received from the server or the first external device. According to various embodiments, upon receiving a signal corresponding to a user manipulation command input by the user from the one determined external device, the server may perform an operation corresponding to the user manipulation command.

According to various embodiments, the server may obtain a response voice corresponding to the response text through a text-to-speech module (e.g., the text-to-speech module 229), and may transmit the obtained response voice to the first external device.

According to various embodiments, the server may transmit the response text to the first external device without performing an operation of converting the response text into a voice, and the first external device may convert the received response text into a voice, and may output the same.

According to various embodiments, the response voice may include information on one determined external device so as to allow the user to view the one determined external device.

According to various embodiments, the server may transmit, to the first external device or one determined external device, a request for confirmation on whether or not to output the response voice to the user utterance voice through the one determined external device. For example, the server may transmit a voice request for confirmation on whether or not to output the response voice through one external device to the first external device, and the first external device may output the received voice request through a speaker included therein or a speaker of the second external device already connected to the first external device. In another embodiment, the server may transmit a request message screen for receiving confirmation on whether or not to output the response voice through one determined external device to the one determined external device, and the one determined external device may display the received request message screen.

According to various embodiments, if a command to output the response voice through one determined external device is received from the first external device or the one determined external device, the server may transmit the response voice to the one determined external device.

Figure 8:
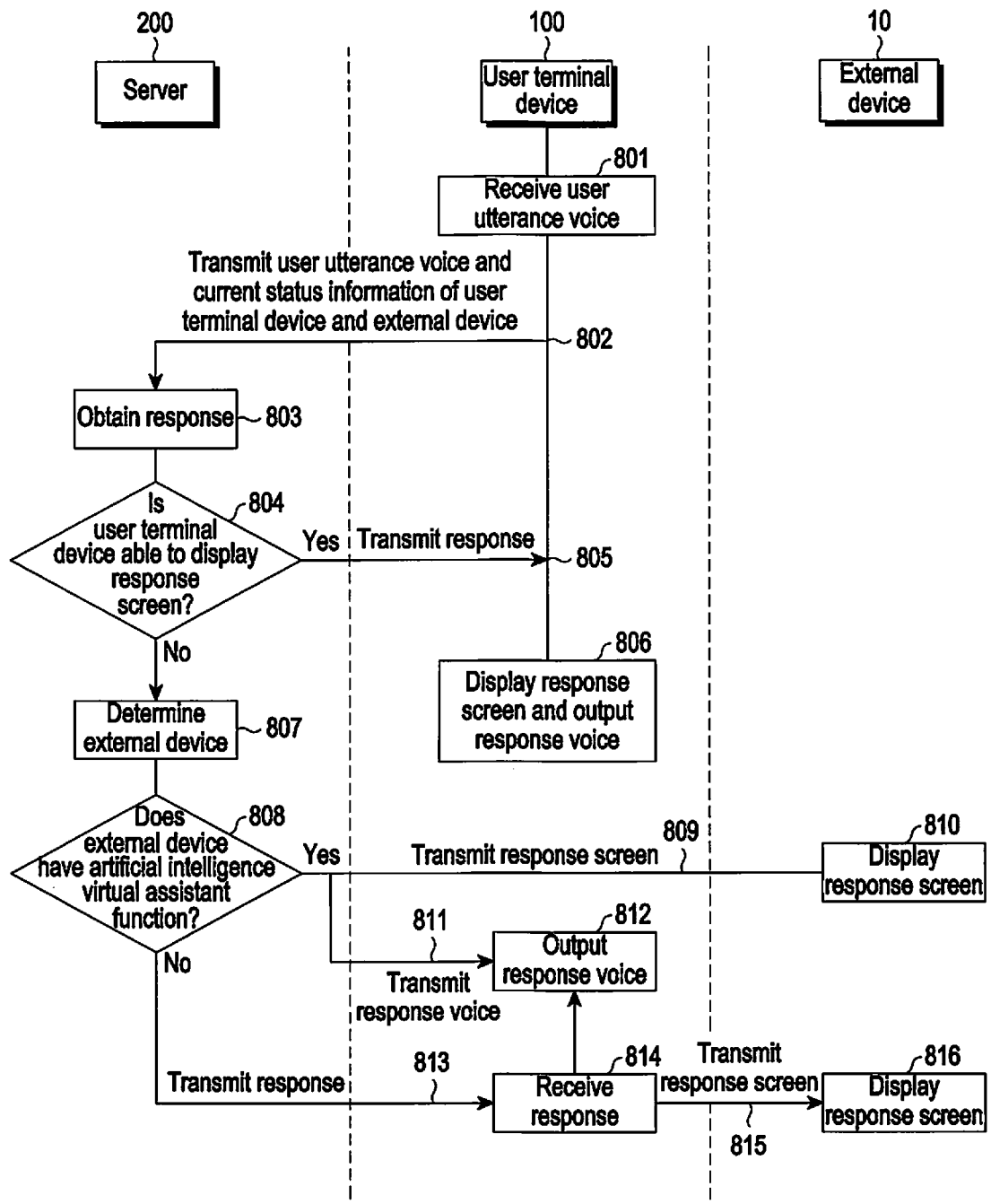
FIG. 8 is a diagram illustrating an operation of providing a screen by a server in an artificial intelligence virtual assistant service according to an embodiment.

FIG. 8 is a diagram illustrating an operation of providing a screen by a server in an artificial intelligence virtual assistant service according to an embodiment.

According to various embodiments, in operation 801, the user terminal device 100 may receive a user utterance voice.

According to various embodiments, in operation 802, the user terminal device 100 may transmit, to a server 200 (e.g., the server 108 in FIG. 1A or the intelligent server 200 in FIG. 1B), the user utterance voice and current status information of the user terminal device 100 and at least one external device connected to the user terminal device 100.

According to various embodiments, the server 200 may receive current status information of at least one IoT device (e.g., the IoT device 605, 606, or 607) from an IoT server (e.g., the IoT server 202). According to various embodiments, since operations 801 to 802 are the same as operation 710 in FIG. 7, duplicate descriptions thereof will be omitted.

According to various embodiments, in operation 803, the server 200 may obtain a response to the user utterance voice. For example, the response to the user utterance voice may include at least one of a response screen and a response voice. Operation 803 is the same as operation 509 in FIG. 5, so a duplicate description thereof will be omitted. Although it is illustrated in FIG. 8 that operation 803 is performed before operation 804, according to various embodiments, operation 803 may be performed after operation 804 or simultaneously with part thereof, or may be performed after/before operation 807 or simultaneously with part of thereof.

According to various embodiments, in operation 804, the server 200 may determine whether or not the user terminal device 100 is able to display a response screen.

According to various embodiments, if the user terminal device 100 is able to display a response screen ("YES" in operation 804), in operation 805, the server 200 may transmit an obtained response to the user terminal device 100. According to various embodiments, in operation 806, the user terminal device 100 may display the response screen received from the server 200, and may output a response voice.

According to various embodiments, if the user terminal device 100 is unable to display the response screen ("NO" in operation 804), in operation 807, the server 200 may determine the external device 10 to be the device to display the response screen. For example, the server 200 may determine the external device 10 to display the response screen on the basis of information on at least one external device, which is received from the user terminal device 100.

Further, the server 200 may receive information on at least one external device, which is connected to the user terminal device 100, from the user terminal device 100 in step 802, and if the user terminal device 100 is unable to display the response screen ("NO" in step 804), the server 200 may receive, from the user terminal device 100, information on at least one external device connected to the user terminal device 100.

According to various embodiments, in operation 808, the server 200 may determine whether or not the external device 10 has an artificial intelligence virtual assistant function. According to various embodiments, if the external device 10 has an artificial intelligence virtual assistant function ("YES" in operation 808), the server 200 may transmit the response screen to the external device 10 in operation 809. According to various embodiments, in operation 810, the external device 10 may display the response screen received from the server 200.

According to various embodiments, if the external device 10 has an artificial intelligence virtual assistant function ("YES" in operation 808), in operation 811, the server 200 may transmit the response voice to the user terminal device 100. According to various embodiments, in operation 812, the user terminal device 100 may output the response voice received from the server 200. According to various embodiments, the response voice may include information on the external device 10 so as to allow the user to view the external device 10.

According to various embodiments, operation 810 in which the external device 10 displays the response screen may be performed simultaneously with at least part of operation 812 in which the user terminal device 100 outputs the response voice.

According to various embodiments, the server 200 may transmit, to the user terminal device 100 or the external device 10, a request for confirmation on whether or not to output the response voice to the user utterance voice through the external device 10. According to various embodiments, when a command to output the response voice through the external device 10 is received from the user terminal device 100 or the external device 10, the server 200 may transmit the response voice to the external device 10.

According to various embodiments, if the external device 10 does not have an artificial intelligence virtual assistant function ("NO" in operation 808), in operation 813, the server 200 may transmit a response including at least one of the response screen or the response voice to the user terminal device 100. According to various embodiments, the user terminal device 100 may receive a response in operation 814, and may transmit the response screen included in the received response to the external device 10 in operation 815.

According to various embodiments, in operation 816, the external device 10 may display the response screen received from the user terminal device 100. According to various embodiments, in operation 812, the user terminal device 100 may output the response voice simultaneously with at least part of operation 816.

FIGS. 9 to 12 are diagrams illustrating an embodiment of an operation of providing a screen of an artificial intelligence virtual assistant service according to the disclosure. According to various embodiments, at least one of an operation of selecting the device to provide a response screen or an operation of obtaining a response to a user utterance voice in FIGS. 9 to 12 may be performed by a user terminal device 100 or a server (e.g., the intelligence server 200).

Figure 9:
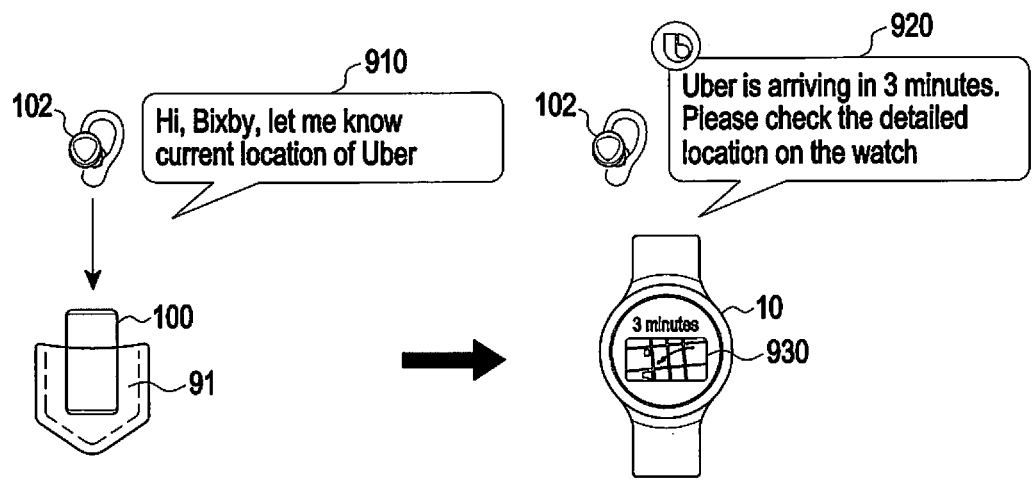
FIG. 9 is a diagram illustrating an embodiment of an operation of providing a screen in an artificial intelligence virtual assistant service according to the disclosure.
Figure 9:
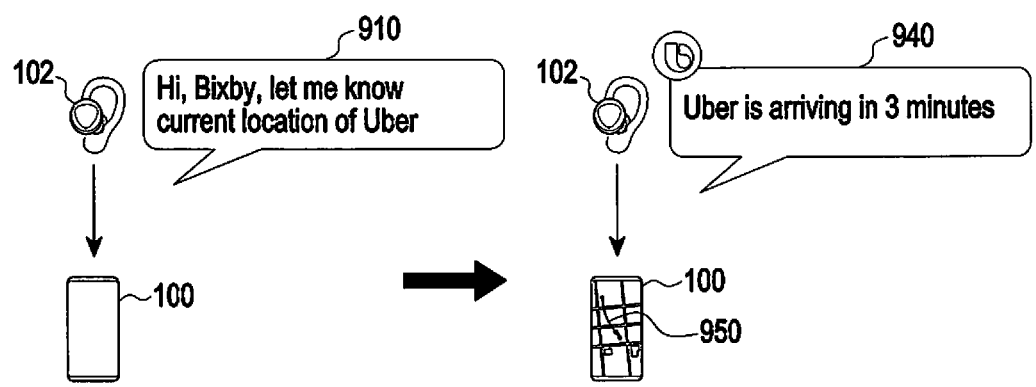

According to various embodiments, referring to (a) of FIG. 9, the user terminal device 100 may receive the user utterance voice 910 through a already connected external device 102 (e.g., wireless earphones). For example, the user utterance voice 910 may be "Hi, Bixby, let me know the current location of Uber".

According to various embodiments, if it is determined that the user terminal device 100 is not in the state capable of providing a response screen to the user utterance voice 910 because the user terminal device 100 is inside a pocket 91, the user terminal device 100 or the server may determine an external device 10 to display the response screen. For example, the external device 10 may be a smart watch including a display.

According to various embodiments, a response voice 920 (e.g., "Uber is arriving in 3 minutes. Please check the detailed location on the watch.") may be output through an external device 102 already connected to the user terminal device 100, and a response screen 930 may be displayed through the determined external device 10. According to various embodiments, the response voice may include information on the external device 10 so as to allow the user to view the external device 10.

According to various embodiments, referring to (b) FIG. 9, the user terminal device 100 may receive a user utterance voice 910 through an external device 102 (e.g., wireless earphones) already connected thereto. For example, the user utterance voice 910 may be "Hi, Bixby, let me know the current location of Uber".

According to various embodiments, if it is determined that the response screen is able to be provided through the user terminal device 100, the user terminal device 100 or the server may output a response voice 940 (e.g., "Uber is arriving in 3 minutes.") through the external device 102 already connected to the user terminal device 100, and the response screen 950 may be displayed through the display included in the user terminal device 100.

Figure 10:
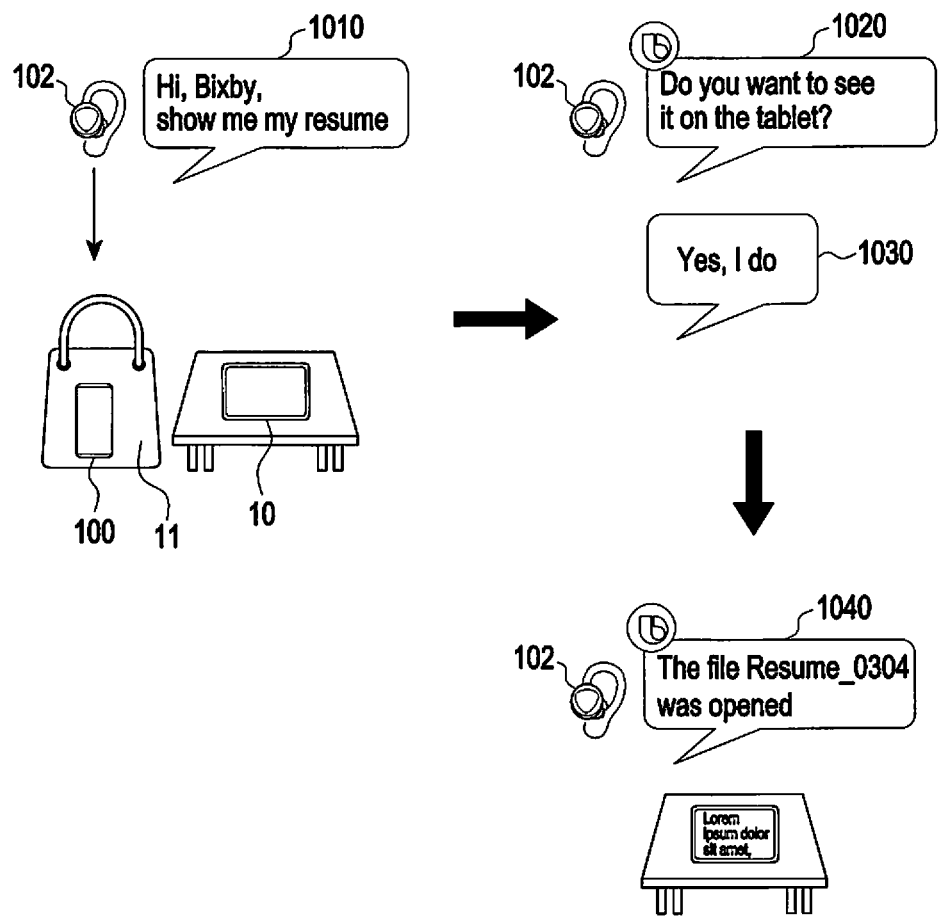
FIG. 10 is a diagram illustrating an embodiment of an operation of providing a screen in an artificial intelligence virtual assistant service according to the disclosure.

According to various embodiments, referring to FIG. 10, the user terminal device 100 may receive a user utterance voice 1010 through an external device 102 (e.g., wireless earphones) already connected thereto. For example, the user utterance voice 1010 may be "Hi, Bixby, show me my resume".

According to various embodiments, if it is determined that the user terminal device 100 is not in the state capable of providing a response screen to the user utterance voice 1010 because the user terminal device 100 is inside a bag 11, the user terminal device 100 or the server may determine an external device 10 to display the response screen. For example, the external device 10 may be a tablet including a display.

According to various embodiments, the user terminal device 100 or the server may output a request 1020 for confirmation on whether or not to display the response screen through the determined external device 10. For example, the user terminal device 100 or the server may output a voice saying "Do you want to see it on the tablet?" through an external device 102.

According to various embodiments, if a command 1030 (e.g., "Yes, I do") to display the response screen through the determined external device 10 is received from the user, the user terminal device 100 or the server may output the response voice 1040 (e.g., "The file Resume_0304 was opened") through the external device 102 already connected to the user terminal device 100, and may display the response screen 1050 on the display of the external device 10.

According to various embodiments, the response voice 1040 (e.g., "The file Resume_0304 was opened on the tablet") may include information on the external device 10 (e.g., the tablet) so as to allow the user to view the external device 10.

Figure 11:
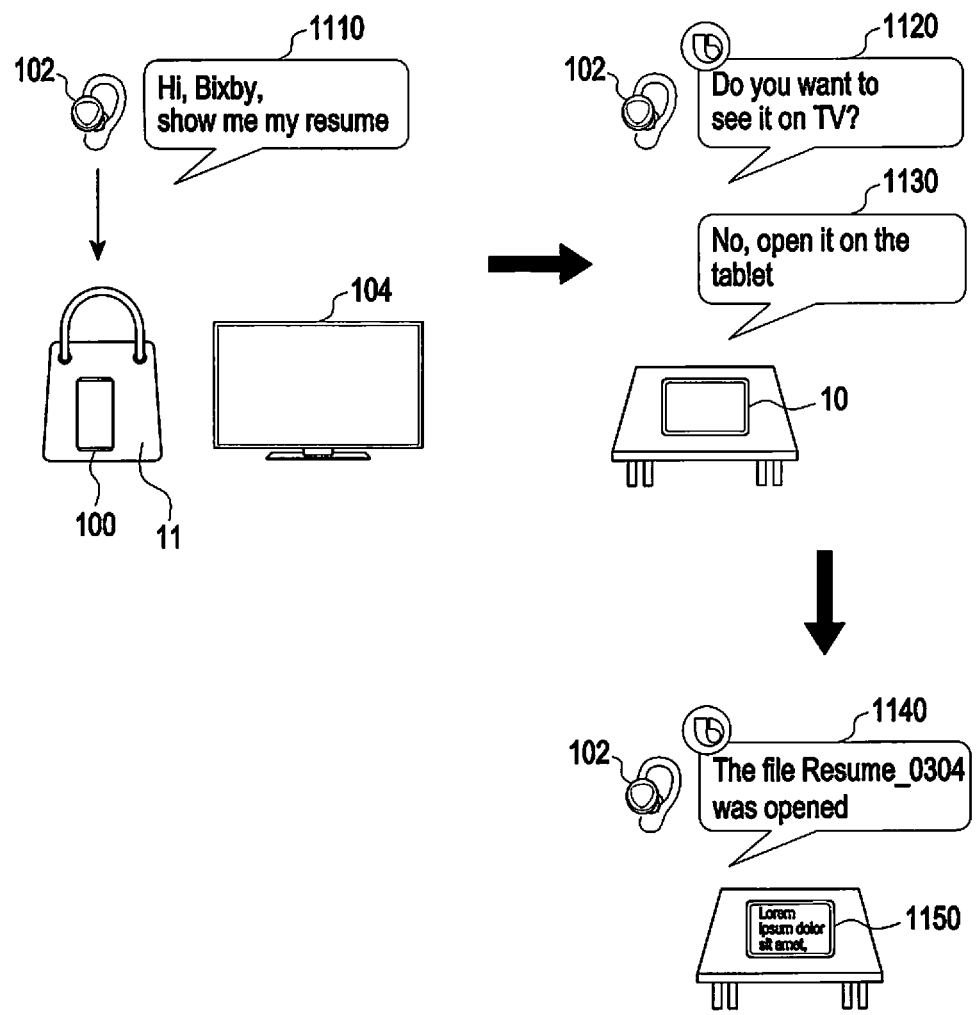
FIG. 11 is a diagram illustrating an embodiment of an operation of providing a screen in an artificial intelligence virtual assistant service according to the disclosure.

According to various embodiments, referring to FIG. 11, the user terminal device 100 may receive a user utterance voice 1110 through an external device 102 (e.g., wireless earphones) already connected thereto. For example, the user utterance voice 1110 may be "Hi, Bixby, show me my resume".

According to various embodiments, if it is determined that the user terminal device 100 is not in the state capable of providing a response screen to the user utterance voice 1110 because the user terminal device 100 is inside a bag 11, the user terminal device 100 or the server may determine an external device 104 to display the response screen. For example, the external device 104 may be a TV set including a display.

According to various embodiments, the user terminal device 100 or the server may output a request 1120 for confirmation on whether or not to display the response screen through the determined external device 104. For example, the user terminal device 100 or the server may output a voice saying "Do you want to see it on TV?" through the external device 102.

According to various embodiments, if a command 1130 to display the response screen through an external device other than the determined external device 104 (e.g., No, open it on the tablet) is received from the user, the user terminal device 100 or the server may output the response voice 1140 through the external device 102 already connected to the user terminal device 100 (e.g., "The file Resume_0304 was opened"), and may display the response screen 1150 on the display of the external device 10 (e.g., the tablet) included in the received command 1130.

Figure 12:
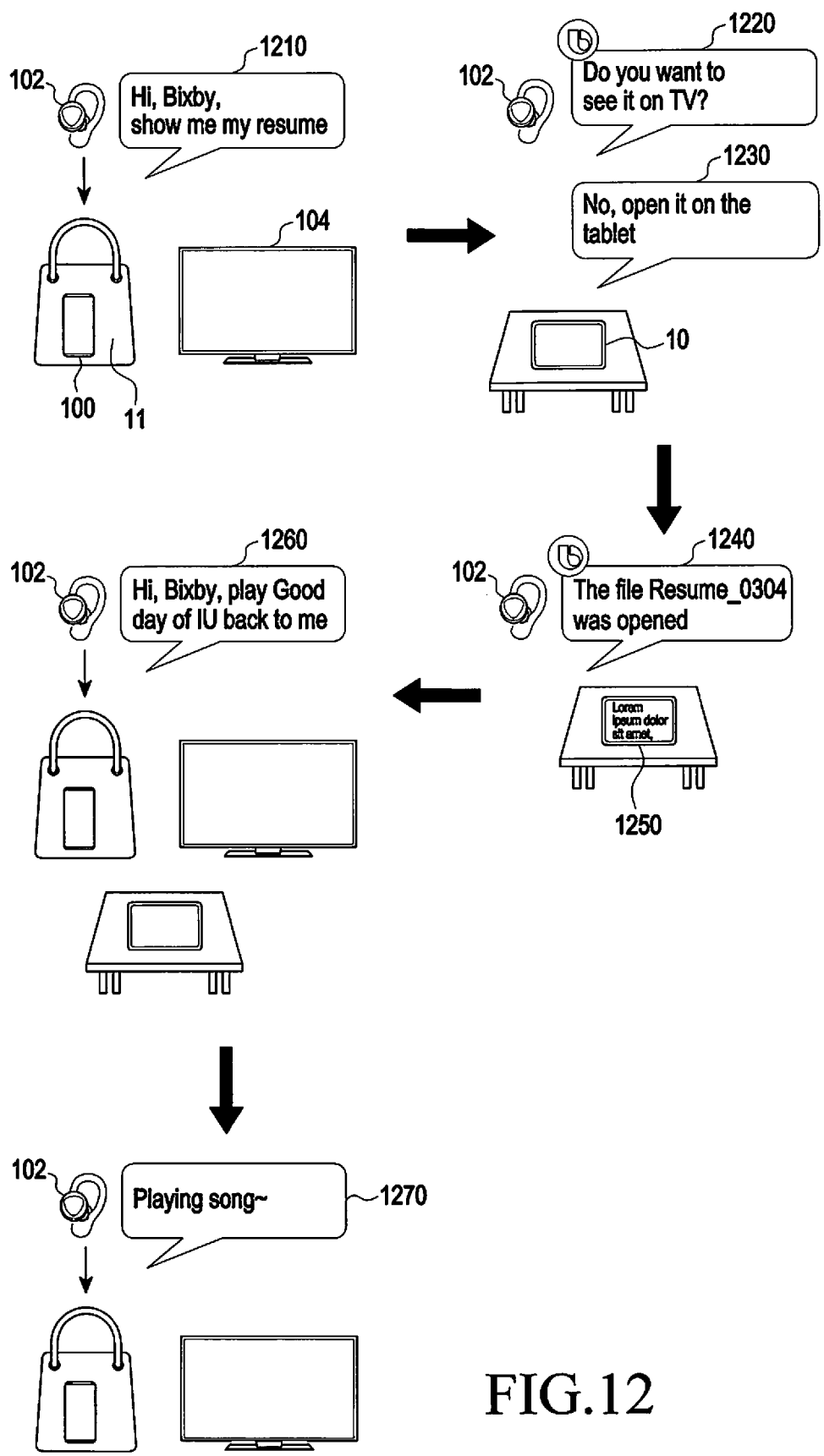
FIG. 12 is a diagram illustrating an embodiment of an operation of providing a screen in an artificial intelligence virtual assistant service according to the disclosure.

According to various embodiments, referring to FIG. 12, the user terminal device 100 may receive a user utterance voice 1210 through the external device 102 (e.g., wireless earphones) already connected thereto. For example, user utterance voice 1210 may be "Hi, Bixby, show me my resume".

According to various embodiments, if it is determined that the user terminal device 100 is not in the state capable of providing a response screen to the user utterance voice 1210 because the user terminal device 100 is inside a bag 11, the user terminal device 100 or the server may determine an external device 104 to display the response screen. For example, the external device 104 may be a TV set including a display.

According to various embodiments, the user terminal device 100 or the server may output a request 1220 for confirmation on whether or not to display the response screen through the determined external device 104. For example, the user terminal device 100 or the server may output a voice request 1220 such as "Do you want to see it on TV?" through an external device 102.

According to various embodiments, if a command 1230 to display the response screen through an external device other than the determined external device 104 (e.g., No, open it on the tablet) is received from the user, the user terminal device 100 or the server may output the response voice 1240 through the external device 102 already connected to the user terminal device 100 (e.g., "The file Resume_0304 was opened"), and may display the response screen 1250 on the display of the external device 10 (e.g., the tablet) included in the received command 1230.

According to various embodiments, the user terminal device 100 may receive a new user utterance voice 1260 through an external device 102 (e.g., wireless earphones) already connected thereto. For example, the new user utterance voice 1260 may be "Hi, Bixby, play Good day of IU back to me"

According to various embodiments, if it is determined that the response screen does not need to be provided as a result of performing an automatic voice recognition operation and a natural language understanding operation on the new user utterance voice 1260, the user terminal device 100 or the server may output a response voice 1270 (e.g., "Playing Good day of IU") through the external device 102 already connected to the user terminal device 100, instead of determining the external device to provide the response screen.

According to various embodiments, a user terminal device may include: a display; at least one sensor; a communication module; and a processor operatively connected to the display, the at least one sensor, and the communication module, wherein the processor may be configured, if a user utterance voice is received, to determine whether or not a response screen corresponding to the user utterance voice is able to be provided through the display on the basis of at least one of a sensed value obtained from the at least one sensor or an inactive period of the display, if it is determined that the response screen is unable to be provided through the display, to receive current status information of at least one external device connected to the user terminal device through the communication module, to determine one external device to display the response screen on the basis of the current status information of the at least one external device, to obtain the response screen to the user utterance voice, and to transmit the response screen to the one external device through the communication module.

According to various embodiments, the processor may include an automatic speech recognition module, a natural language understanding module, and a natural language generator module, and may be configured to obtain response text to the received user utterance voice using the automatic speech recognition module, the natural language understanding module, and the natural language generator module, produce a response screen on the basis of the obtained response text and information on a display included in the one external device, and transmit the produced response screen to the one external device.

According to various embodiments, the processor may be configured to transmit information on the one external device and information on the user utterance voice to a server, obtain a response screen and a response voice to the user utterance voice from the server, transmit the response screen to the one external device, and output the response voice through a speaker of the user terminal device or an external speaker already connected to the user terminal device.

According to various embodiments, the at least one sensor may include an illuminance sensor, and the processor may be configured to determine whether or not the response screen is able to be provided through the display on the basis of an illuminance value obtained through the illuminance sensor.

According to various embodiments, the current status information of the at least one external device may include at least one of a running application, whether or not video content is being played, strength of a communication signal, or a battery level in the at least one external device.

According to various embodiments, the processor may be configured to output a request for confirmation on whether or not to display the response screen on the one determined external device through a speaker of the user terminal device or an external speaker already connected to the user terminal device, and if a command to display the response screen through a second external device other than the one determined external device is received in response to the request, to transmit the response screen to the second external device other than the one determined external device.

According to various embodiments, the processor may be configured, if the display switches to a state capable of providing the response screen after transmitting the response screen to the one external device, to transmit a signal for stopping the display of the response screen to the one external device and to display the response screen on the display.

According to various embodiments, the processor may be configured to receive a user utterance voice, which is obtained using an external microphone connected to the user terminal device, through the communication module and determine one external device to display the response screen by further considering the location of the external microphone.

According to various embodiments, the processor may be configured, if a signal corresponding to a user manipulation command is received from the one external device after transmitting the response screen to the one external device, to perform an operation corresponding to the user manipulation command.

According to various embodiments, a server may include: a communication module; and a processor operatively connected to the communication module, wherein the processor may be configured to receive, from a first external device that receives a user utterance voice, information on the user utterance voice, current status information of the first external device, and current status information of at least one second external device connected to the first external device through the communication module, to receive current status information of at least one IoT device from an IoT server connected to the server through the communication module, based on sensing information of the first external device, to determine whether or not the first external device is in a state capable of providing a response screen corresponding to the user utterance voice, if it is determined that the first external device is not in the state capable of providing the response screen, to determine one external device to display the response screen on the basis of at least one piece of the current status information of the at least one second external device or the current status information of the at least one IoT device, to obtain the response screen to the user utterance voice, and to transmit the response screen corresponding to the user utterance voice to the one external device through the communication module.

According to various embodiments, the processor may be configured to transmit the response screen to the one external device if the one external device supports an artificial intelligence virtual assistant function, and transmit the response screen to the first external device such that the first external device transmits the response screen to the one external device if the one external device does not support the artificial intelligence virtual assistant function.

According to various embodiments, the processor may include an automatic speech recognition module, a natural language understanding module, and a natural language generator module, and may be configured to obtain response text to the received user utterance voice using the automatic speech recognition module, the natural language understanding module, and the natural language generator module, produce a response screen on the basis of the obtained response text and information on a display included in the one external device, and transmit the produced response screen to the one external device.

According to various embodiments, the processor may be configured, if a result of natural language understanding of the user utterance voice includes information related to a device that is to provide a response corresponding to the user utterance voice, to determine the device included in the user utterance voice to be the one external device to display the response screen.

According to various embodiments, the current status information of the first external device may include at least one of an illuminance value obtained by the first external device or an inactivation period of a display of the first external device.

According to various embodiments, the current status information of the at least one second external device or the current status information of the at least one IoT device may include at least one of a running application, whether or not a video is being played, strength of a communication signal, or a battery level in the at least one second external device or the at least one IoT device.

According to various embodiments, the processor may be configured to transmit, to the first external device, a request for confirmation on whether or not to display the response screen on the one determined external device, and if a command to display the response screen through a second external device other than the one determined external device is received from the first external device in response to the request, to transmit the response screen to the second external device other than the one determined external device.

According to various embodiments, the processor may be configured, if the first external device switches to a state capable of providing the response screen after transmitting the response screen to the one external device, to transmit a signal for stopping the display of the response screen to the one external device and to transmit the response screen to the first external device.

According to various embodiments, the processor may be configured, if a signal corresponding to a user manipulation command is received from the one external device after transmitting the response screen to the one external device, to perform an operation corresponding to the user manipulation command.

According to various embodiments, the processor may be configured to transmit, to the first external device, a response voice to the user utterance voice.

According to various embodiments, the processor may be configured to transmit, to the first external device or the one external device, a request for confirmation on whether or not to output the response voice to the user utterance voice through the one external device, and if a command to output the response voice through the one external device is received in response to the request, to transmit the response voice to the one external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

According to various embodiments, in the case where visual information is unable to be provided through the display of the electronic device providing an artificial intelligence virtual assistant service, it is possible to provide visual information through a display of a neighboring electronic device.

According to various embodiments, in the case where a display of a neighboring electronic device includes a touch panel, it is possible to receive a user manipulation command through a touch.

Accordingly, the artificial intelligence virtual assistant service is able to provide a highly complete experience of the artificial intelligence virtual assistant service even when visual information is unable to be provided through the display of the electronic device.

In addition, various effects identified directly or indirectly through this document may be provided.

The invention claimed is:
1. A user terminal device comprising:
a display;
at least one sensor;
a communication module; and
a processor operatively connected to the display, the at least one sensor, and the communication module,
wherein the processor is configured to:
based on receiving a user utterance voice, determine whether a response screen corresponding to the user utterance voice is able to be provided through the display on a basis of at least one of a sensed value obtained from the at least one sensor or an inactive period of the display,
based on determining that the response screen is unable to be provided through the display, receive current status information of at least one external device connected to the user terminal device through the communication module,
determine one external device among the at least one external device to display the response screen on a basis of the current status information of the at least one external device,
obtain the response screen to the user utterance voice, and
transmit the response screen to the one external device through the communication module.

2. The user terminal device of claim 1, wherein the processor comprises an automatic speech recognition module, a natural language understanding module, and a natural language generator module, and is further configured to,
obtain response text to the received user utterance voice using the automatic speech recognition module, the natural language understanding module, and the natural language generator module,
produce a response screen on a basis of the obtained response text and information on a display included in the one external device, and
transmit the produced response screen to the one external device.

3. The user terminal device of claim 1, wherein the processor is further configured to:
transmit information on the one external device and information on the user utterance voice to a server,
obtain a response screen and a response voice to the user utterance voice from the server,
transmit the response screen to the one external device, and
output the response voice through a speaker of the user terminal device or an external speaker already connected to the user terminal device.

4. The user terminal device of claim 1, wherein the at least one sensor comprises an illuminance sensor, and
wherein the processor is further configured to determine whether the response screen is able to be provided through the display on a basis of an illuminance value obtained through the illuminance sensor.

5. The user terminal device of claim 1, wherein the current status information of the at least one external device comprises information on at least one of a running application, whether video content is being played, strength of a communication signal, or a battery level in the at least one external device.

6. The user terminal device of claim 1, wherein the processor is further configured to:
output a request for confirmation on whether to display the response screen on the one external device through a speaker of the user terminal device or an external speaker already connected to the user terminal device, and
based on receiving a command to display the response screen through a second external device other than the one external device in response to the request, transmit the response screen to the second external device other than the one external device.

7. The user terminal device of claim 1, wherein the processor is further configured to, based on an electronic device changing to a state capable of providing the response screen through the display after transmitting the response screen to the one external device, transmit a signal for stopping displaying the response screen to the one external device and display the response screen on the display.

8. The user terminal device of claim 1, wherein the processor is further configured to:
   receive a user utterance voice, which is obtained using an external microphone connected to the user terminal device, through the communication module, and
   determine one external device to display the response screen by further considering a location of the external microphone.

9. The user terminal device of claim 1, wherein the processor is further configured to, based on receiving a signal corresponding to a user manipulation command from the one external device after transmitting the response screen to the one external device, perform an operation corresponding to the user manipulation command.

10. A server comprising:
    a communication module; and
    a processor operatively connected to the communication module,
    wherein the processor is configured to:
    receive, from a first external device that receives a user utterance voice, information on the user utterance voice, current status information of the first external device, and current status information of at least one second external device connected to the first external device through the communication module,
    receive current status information of at least one Internet of things (IoT) device from an IoT server connected to the server through the communication module,
    based on sensing information of the first external device, determine whether the first external device is in a state capable of providing a response screen corresponding to the user utterance voice,
    based on determining that the first external device is not in the state capable of providing the response screen, determine one external device among at least one external device to display the response screen on a basis of at least one piece of the current status information of the at least one second external device or the current status information of the at least one IoT device,
    obtain the response screen to the user utterance voice, and
    transmit the response screen corresponding to the user utterance voice to the one external device through the communication module.

11. The server of claim 10, wherein the processor is further configured to:
    transmit the response screen to the one external device based on the one external device supporting an artificial intelligence virtual assistant function, and
    transmit the response screen to the first external device such that the first external device transmits the response screen to the one external device based on the one external device not supporting the artificial intelligence virtual assistant function.

12. The server of claim 10, wherein the processor comprises an automatic speech recognition module, a natural language understanding module, and a natural language generator module, and is further configured to:
    obtain response text to the received user utterance voice using the automatic speech recognition module, the natural language understanding module, and the natural language generator module,
    produce a response screen on a basis of the obtained response text and information on a display included in the one external device, and
    transmit the produced response screen to the one external device.

13. The server of claim 10, wherein the processor is further configured to, based on a result of natural language understanding of the user utterance voice comprising information related to a device that is to provide a response corresponding to the user utterance voice, determine the device included in the user utterance voice to be the one external device to display the response screen.

14. The server of claim 10, wherein the current status information of the first external device comprises at least one of an illuminance value obtained by the first external device or an inactivation period of a display of the first external device.

15. The server of claim 10, wherein the current status information of the at least one second external device or the current status information of the at least one IoT device comprises information on at least one of a running application, whether a video is being played, strength of a communication signal, or a battery level in the at least one second external device or the at least one IoT device.

* * * * *